United States Patent
Tanaka

(10) Patent No.: US 11,682,131 B2
(45) Date of Patent: Jun. 20, 2023

(54) IMAGE CAPTURING APPARATUS AND METHOD OF CONTROLLING IMAGE CAPTURING APPARATUS

(71) Applicant: CANON KABUSHIKI KAISHA, Tokyo (JP)

(72) Inventor: Shin Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/156,843

(22) Filed: Oct. 10, 2018

(65) Prior Publication Data
US 2019/0130591 A1    May 2, 2019

(30) Foreign Application Priority Data
Oct. 27, 2017    (JP) .............................. JP2017-208366

(51) Int. Cl.
*G06T 7/564*    (2017.01)
*G06T 7/55*    (2017.01)
(Continued)

(52) U.S. Cl.
CPC .............. *G06T 7/55* (2017.01); *G06T 5/002* (2013.01); *G06T 5/20* (2013.01); *G06T 7/11* (2017.01);
(Continued)

(58) Field of Classification Search
CPC ............ G06T 7/60; G06T 2207/10148; G06T 2207/10012; G06T 2207/10028;
(Continued)

(56) References Cited

U.S. PATENT DOCUMENTS 8,068,164 B2 * 11/2011 Kumagai ............... G03B 13/30
348/345
11,002,538 B2 * 5/2021 Nobayashi ........... H04N 5/2254
(Continued)

FOREIGN PATENT DOCUMENTS

JP    2003083742 A      3/2003
JP    2005030891 A *   2/2005
(Continued)

OTHER PUBLICATIONS

Machine translation of JP-2012-32349 A, Stereo Camera System and Vehicle Equipped With the System, 17 pages. Retrieved via Search. (Year: 2022).*

(Continued)

*Primary Examiner* — Matthew C Bella
*Assistant Examiner* — Dennis Rosario
(74) *Attorney, Agent, or Firm* — Canon U.S.A., Inc. IP Division

(57) ABSTRACT

A distance information generation apparatus includes a generation unit configured to generate distance information using first and second image signals captured from different viewpoints, a detection unit configured to detect a known-shape subject using the image signals, an extraction unit configured to extract, from the distance information generated by the generation unit, distance information corresponding to the subject, a calculation unit configured to calculate, based on the distance information and the shape of the subject detected by the detection unit, a correction parameter for correcting the distance information extracted by extraction unit, and a correction unit configured to correct, using the correction parameter calculated by the calculation unit, the distance information generated by the generation unit.

18 Claims, 13 Drawing Sheets

(51) Int. Cl.
| | |
|---|---|
| *G06T 7/80* | (2017.01) |
| *G06T 7/20* | (2017.01) |
| *G06T 7/194* | (2017.01) |
| *G06T 5/20* | (2006.01) |
| *G06T 5/00* | (2006.01) |
| *G06T 7/11* | (2017.01) |
| *G06T 7/593* | (2017.01) |

(52) U.S. Cl.
CPC ............... *G06T 7/194* (2017.01); *G06T 7/20* (2013.01); *G06T 7/564* (2017.01); *G06T 7/593* (2017.01); *G06T 7/80* (2017.01); *G06T 2207/10012* (2013.01); *G06T 2207/10024* (2013.01)

(58) Field of Classification Search
CPC . G06T 7/593; G06T 7/50; G06T 2207/10081; G06T 2207/20084; G06T 2207/20221; G06T 2207/20224; G06T 5/50; G06T 2207/30252; G06T 7/13; G06T 11/203; G06T 7/514; G06T 7/507; G06T 7/521; G06T 7/529; G06T 7/536; G06T 7/543; G06T 7/55; G06T 7/557; G06T 7/564; G06T 7/571; G06T 7/579; G06T 7/586; G06T 7/596; G06T 1/00; G06T 7/12; G06T 2207/20192; G06T 2207/10016; G06T 7/10; G06T 7/246; G06T 2207/30256; H04N 13/271; H04N 13/128; H04N 5/23212; H04N 2013/0081; H04N 13/239; H04N 13/243; G06V 20/64; G06V 10/44; G06V 10/443; G06V 20/588; G06V 20/58; G06V 20/582; G06V 20/584; G06V 20/586; G06V 20/56; G06V 20/647; G06V 20/653; G06V 10/46; G06V 20/176

See application file for complete search history.

(56) References Cited

U.S. PATENT DOCUMENTS

| | | | | |
|---|---|---|---|---|
| 2012/0050488 | A1* | 3/2012 | Cohen | G02B 13/16 |
| | | | | 348/46 |
| 2014/0184800 | A1* | 7/2014 | Hirai | G06V 20/588 |
| | | | | 348/148 |
| 2015/0043783 | A1* | 2/2015 | Ishihara | G06T 7/571 |
| | | | | 382/106 |
| 2015/0139534 | A1* | 5/2015 | Komatsu | G06T 7/536 |
| | | | | 382/154 |
| 2015/0146215 | A1* | 5/2015 | Kobayashi | G01B 11/2513 |
| | | | | 356/610 |
| 2016/0248967 | A1* | 8/2016 | Sasaki | G01C 3/06 |
| 2017/0148168 | A1* | 5/2017 | Lindner | G06T 5/50 |

FOREIGN PATENT DOCUMENTS

| | | | | |
|---|---|---|---|---|
| JP | 3826245 B2 * | 9/2006 | | B60N 2/002 |
| JP | 2012032349 A * | 2/2012 | | |
| WO | 2010/010707 A1 | 1/2010 | | |
| WO | WO-2012013486 A1 * | 2/2012 | | H04N 13/271 |
| WO | WO-2018138516 A1 * | 8/2018 | | G06K 9/6203 |

OTHER PUBLICATIONS

Machine translation:Crew Attitude Determination Device via Search of JP-3826245-B2 to Tanaka, retrieved Aug. 11, 2022, 29 pages. (Year: 2022).*

Search machine translation of JP-2005-030891-A to Tetsuo, retrieved Jan. 26, 2023, 16 pages. (Year: 2023).*

* cited by examiner

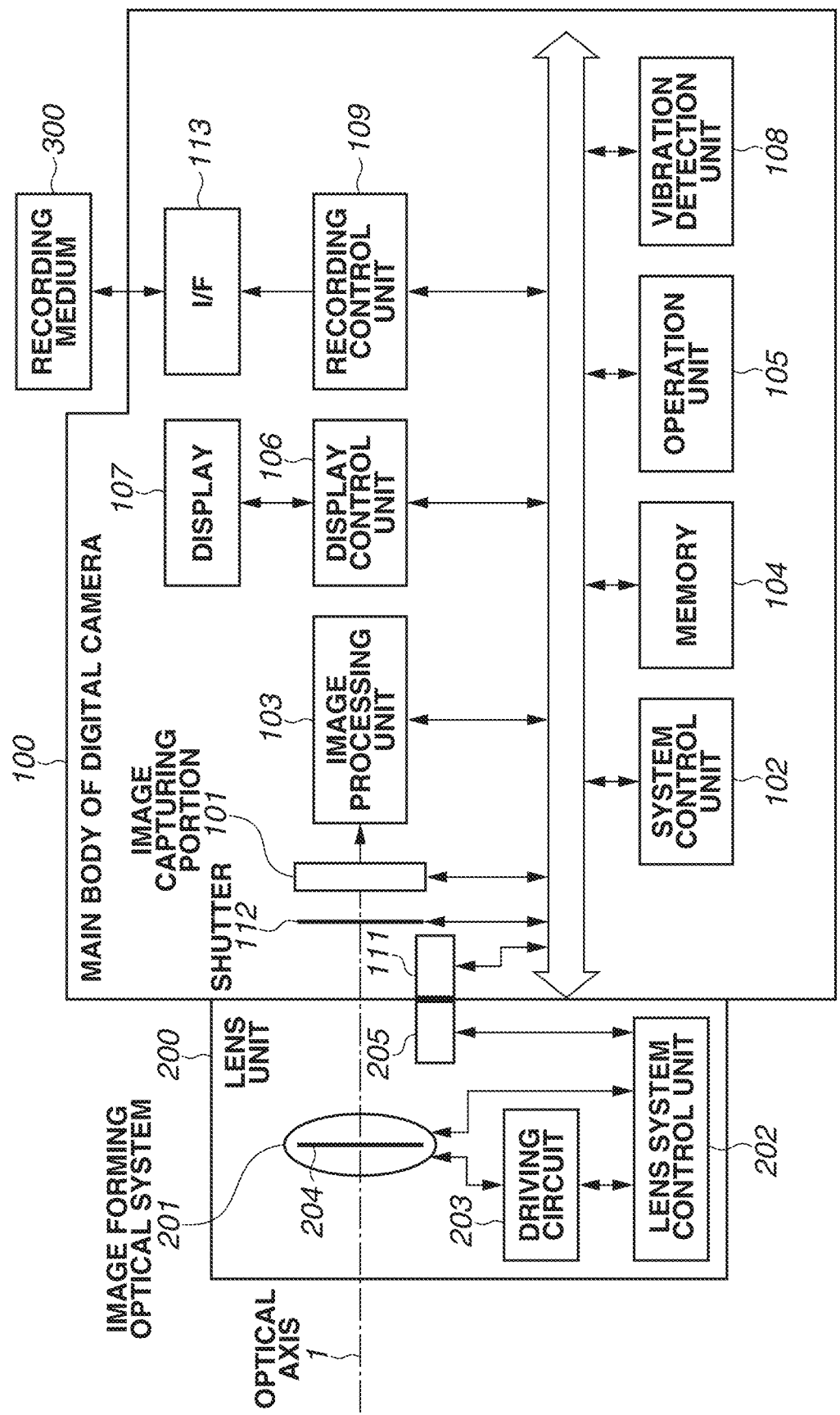

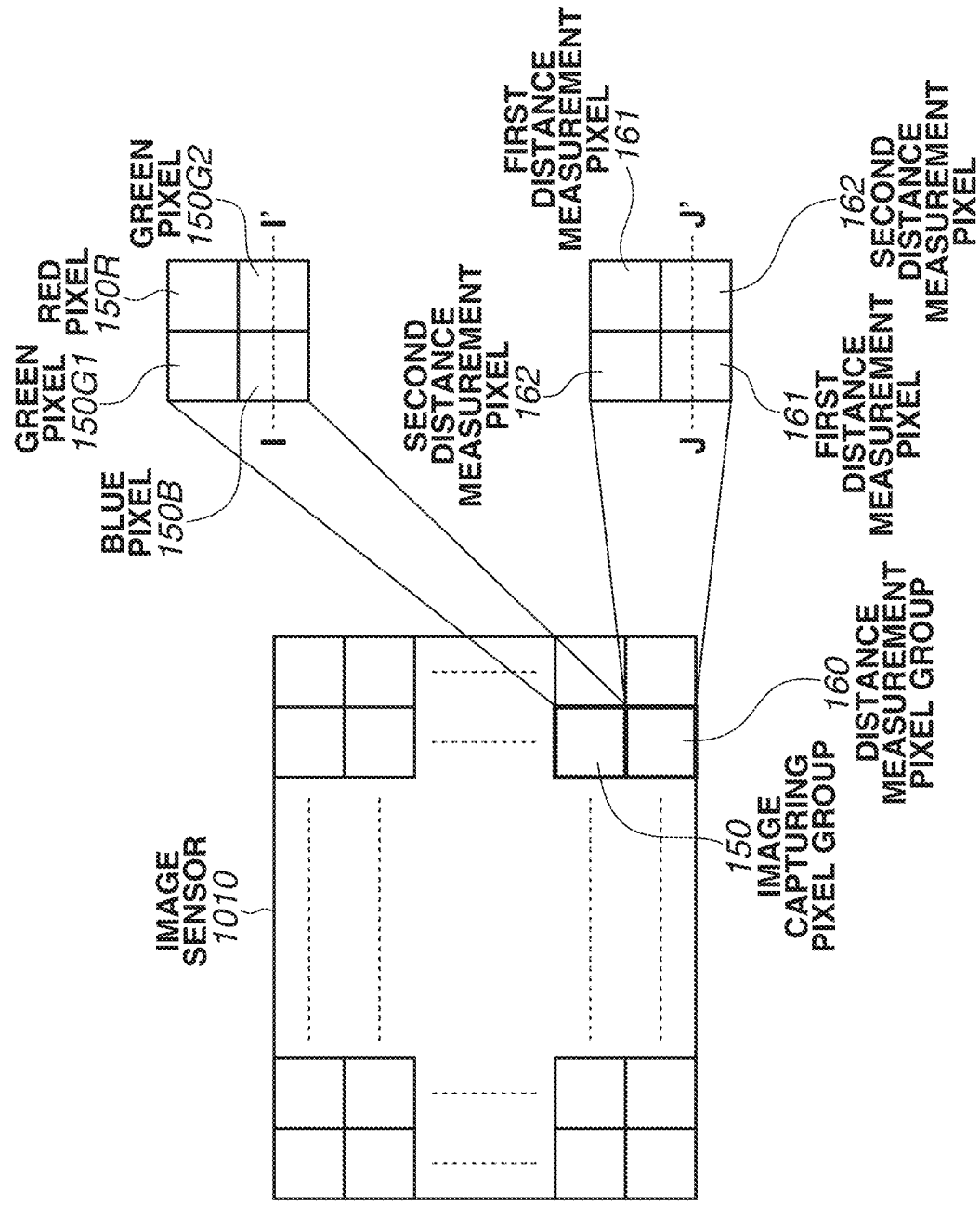

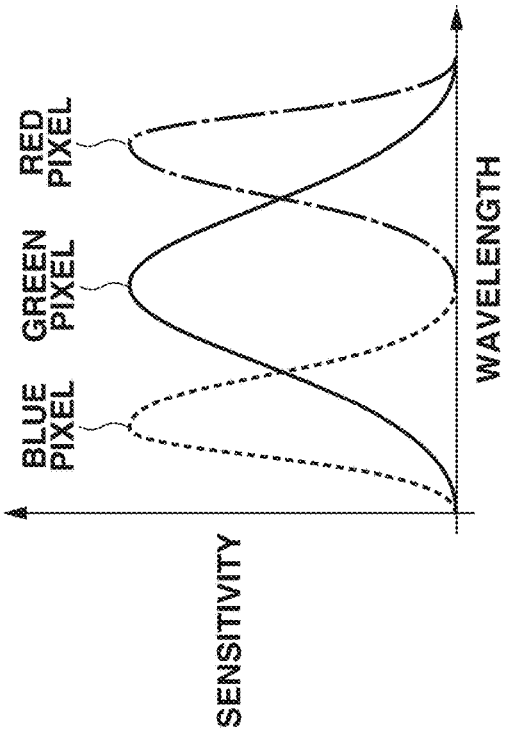
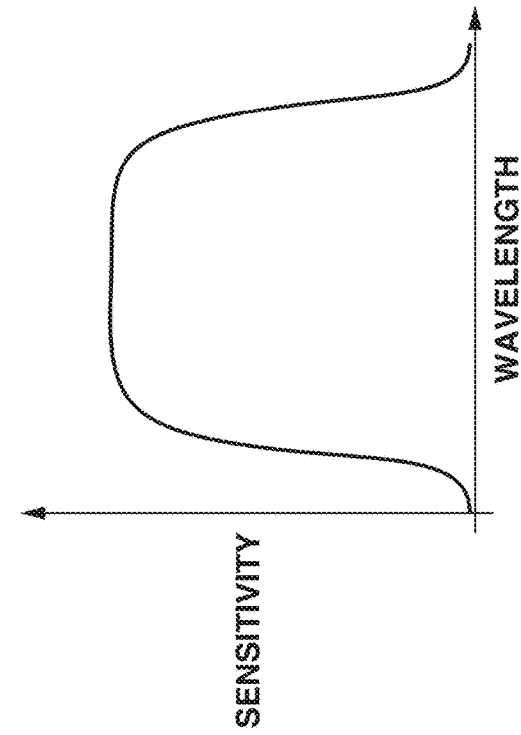
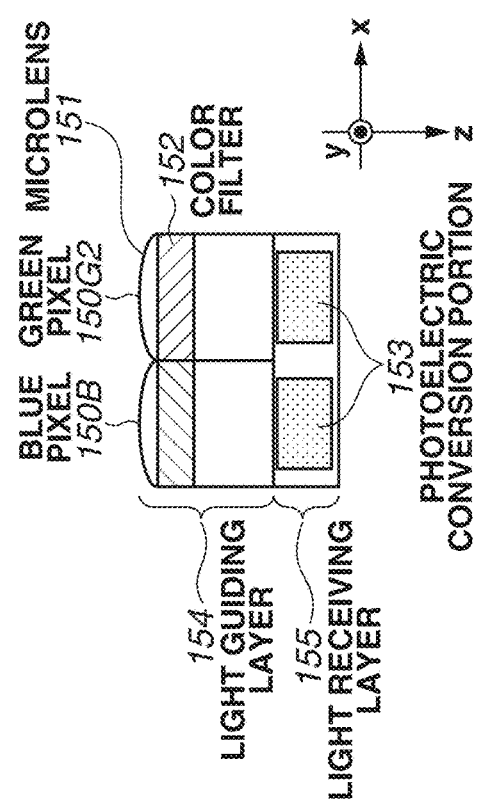
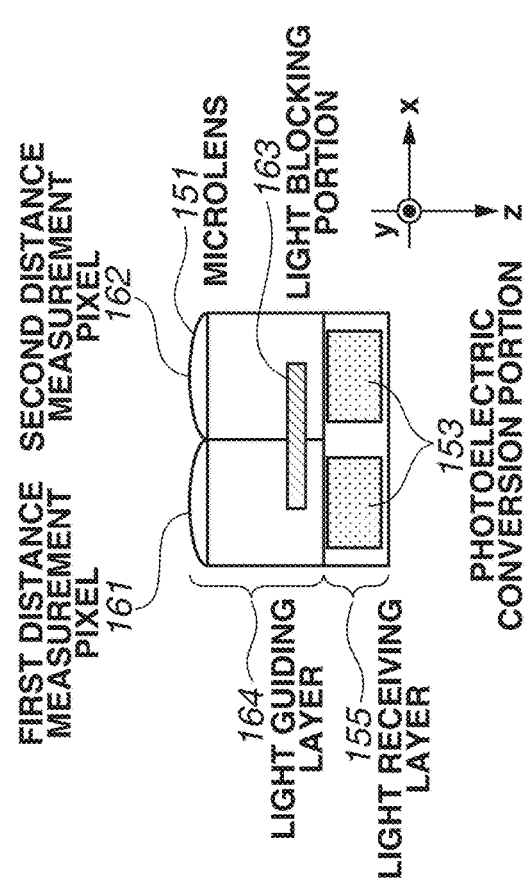

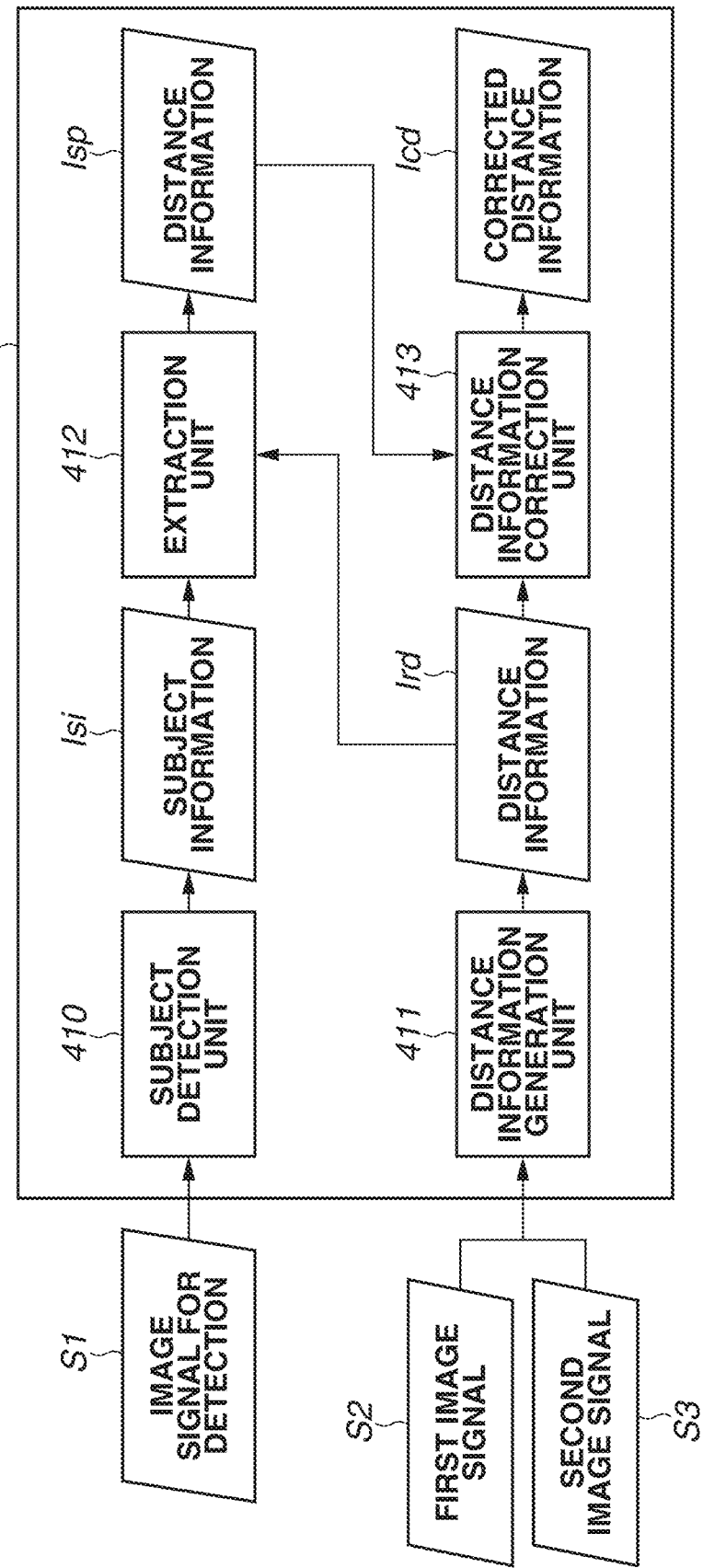

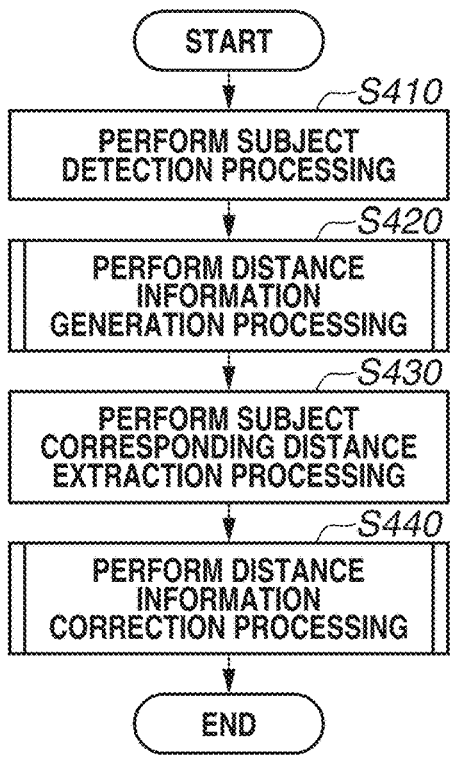
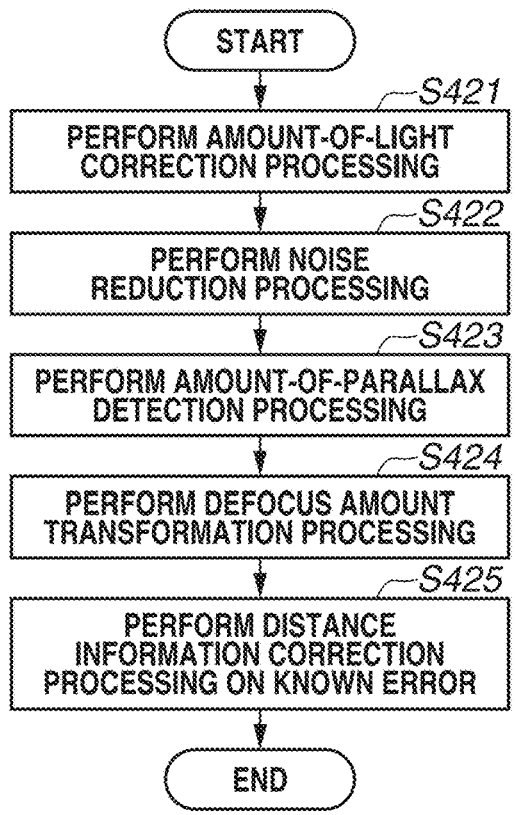
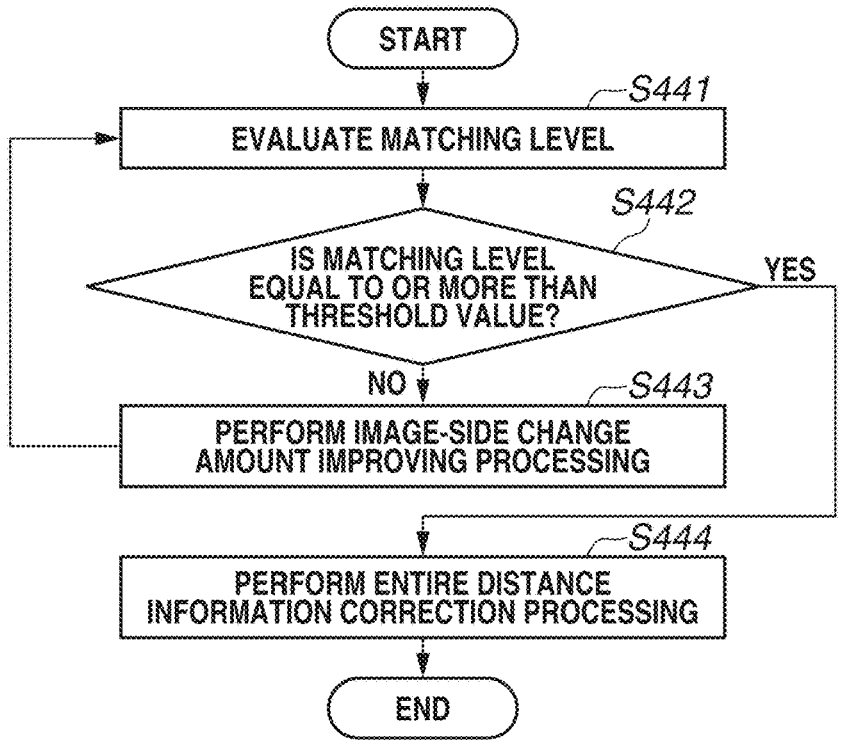

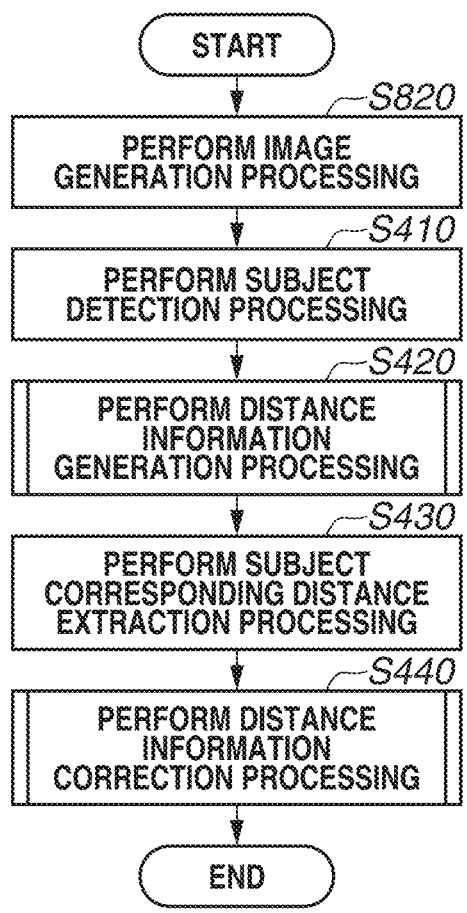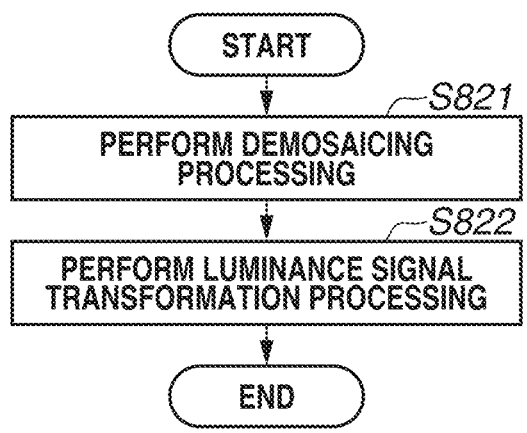

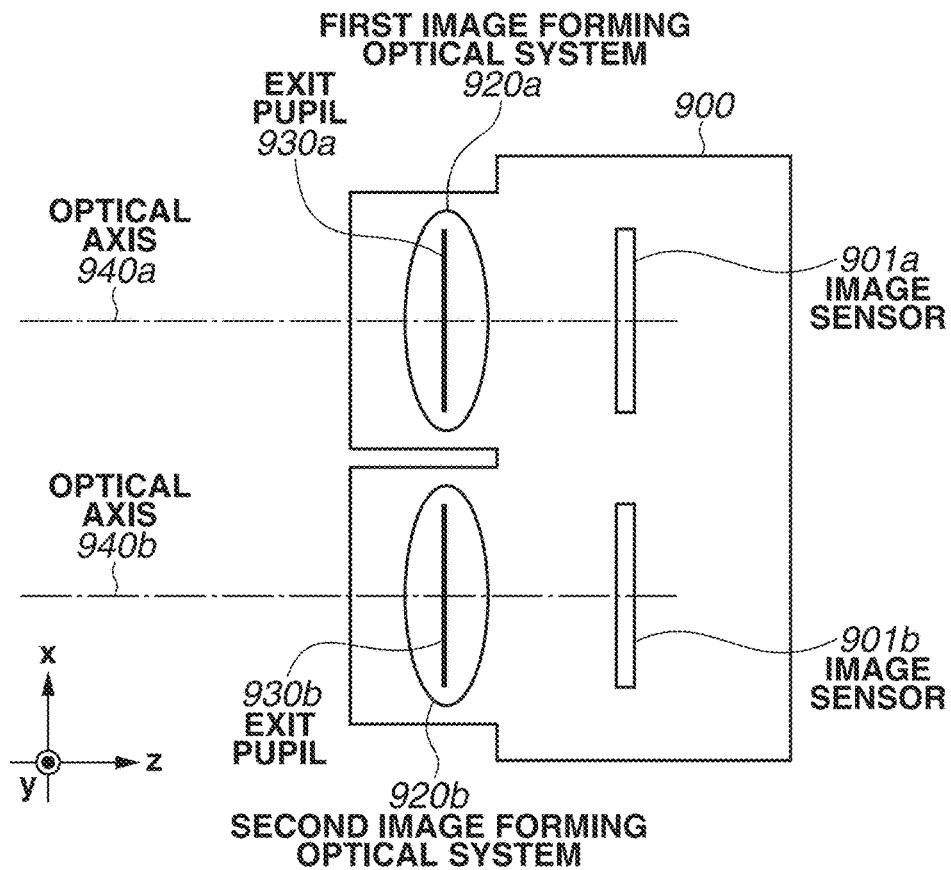
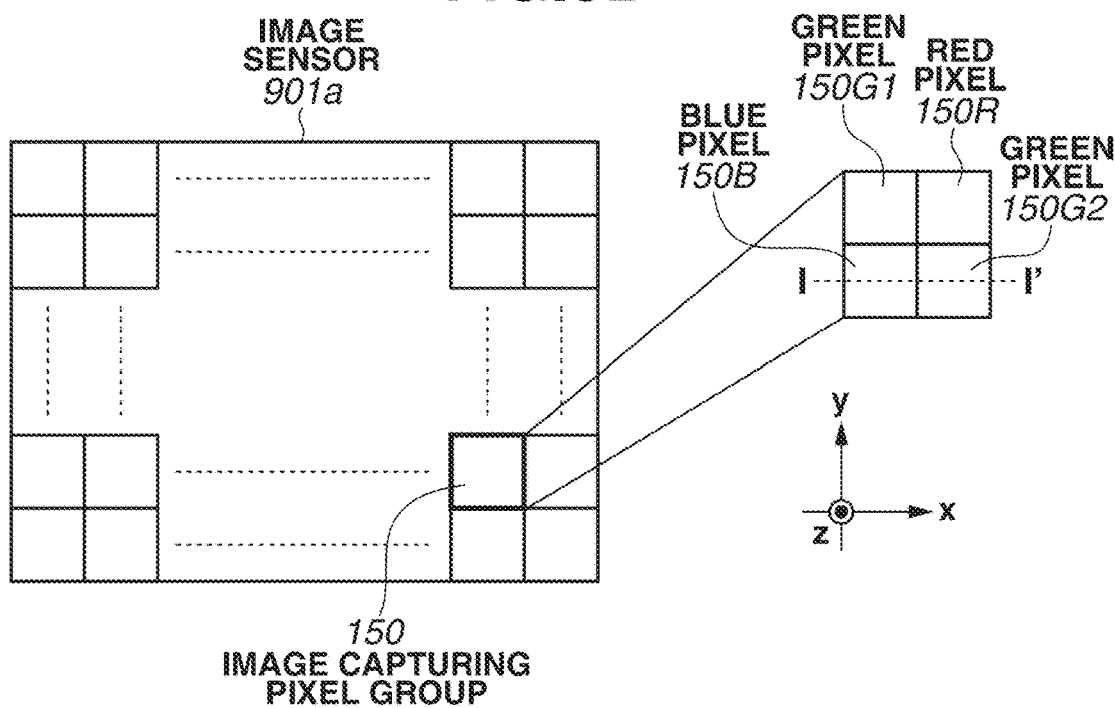

IMAGE CAPTURING APPARATUS AND METHOD OF CONTROLLING IMAGE CAPTURING APPARATUS

BACKGROUND OF THE INVENTION

Field of the Invention

The present invention relates to an image capturing apparatus for use in digital cameras, digital video cameras, vehicle-mounted sensor devices, robot vision sensor devices, etc. that includes a distance measurement function, and relates to a method of controlling the image capturing apparatus.

Description of the Related Art

An image capturing apparatus has been discussed that includes a distance measurement function to acquire the defocus state of a subject or distance information such as a distance (hereinafter, "subject distance") from the image capturing apparatus to the subject based on image signals with parallax (image signals captured from different viewpoints).

SUMMARY OF THE INVENTION

According to an aspect of the present disclosure, a distance information generation apparatus includes a generation unit configured to generate distance information using first and second image signals captured from different viewpoints, a detection unit configured to detect a known-shape subject using the image signals, an extraction unit configured to extract, from the distance information generated by the generation unit, distance information corresponding to the subject detected by the detection unit, a calculation unit configured to calculate a correction parameter for correcting the distance information extracted by the extraction unit, based on the distance information extracted by the extraction unit and the shape of the subject detected by the detection unit, and a correction unit configured to correct the distance information generated by the generation unit, using the correction parameter calculated by the calculation unit.

Further, features of the present disclosure will become apparent from the following description of exemplary embodiments with reference to the attached drawings.

BRIEF DESCRIPTION OF THE DRAWINGS

FIGS. 1A and 1B illustrate an image capturing apparatus according to a first exemplary embodiment.

FIGS. 2A, 2B, 2C, and 2D illustrate an image sensor portion of the image capturing apparatus according to the first exemplary embodiment.

FIGS. 4A, 4B, 4C, and 4D illustrate an image processing apparatus and processes performed by the image processing apparatus according to the first exemplary embodiment.

FIGS. 8A, 8B, and 8C illustrate the image processing apparatus and the processes performed by the image processing apparatus according to the second exemplary embodiment.

FIGS. 9A and 9B illustrate the image capturing apparatus and the image sensor portion according to a third exemplary embodiment.

DESCRIPTION OF THE EMBODIMENTS

Figure 3A:
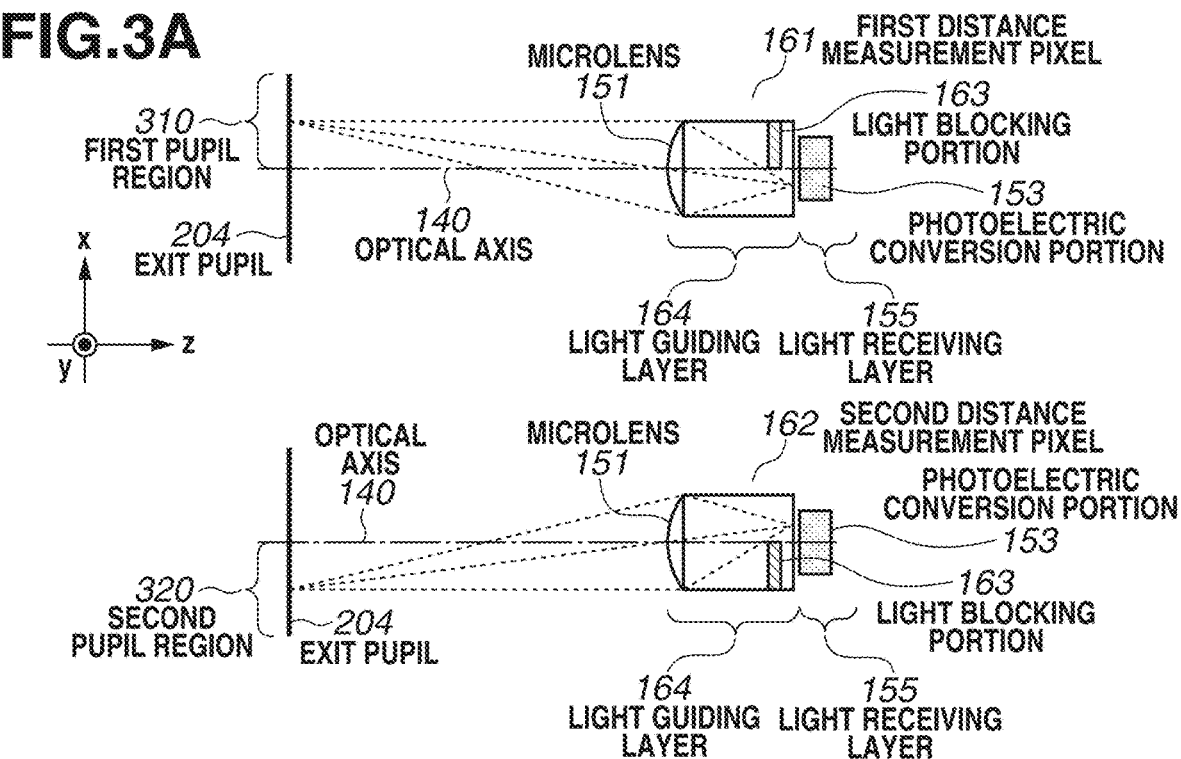
FIGS. 3A, 3B, 3C, and 3D illustrate an image capturing state of the image capturing apparatus according to the first exemplary embodiment.

In conventional image capturing apparatuses that include a distance measurement function, the relationship between an optical system and an image sensor can be displaced due to thermal expansion/contraction of a lens and/or a lens barrel, etc. to cause distance measurement errors. WO2010/010707 discusses a technique of generating a correction coefficient for correcting the distance measurement errors using temperatures detected by a temperature sensor. The technique discussed in WO2010/010707, however, requires an additional temperature sensor and is only capable of measuring the temperature in the vicinity of the temperature sensor, so that if the temperature on the sensor surface or of the lens has a distribution (variation), precise detection of changes in the temperature can be difficult to make accurate correction of distance measurement errors difficult.

The present disclosure is directed to a distance information generation device that generates distance information from images of a plurality of different viewpoints acquired from image sensors and reduces the effect of temporal errors.

A first exemplary embodiment of the present disclosure will be described in detail below with reference to the drawings. While a digital camera is described as an example of an image capturing apparatus including a distance information generation device according to the present exemplary embodiment, applications of the present disclosure are not limited to the digital camera. Further, in the descriptions with reference to the drawings, the same reference numerals are basically used with respect to similar portions across the drawings of different drawing numbers to avoid as many duplicates as possible.

<Configuration of Digital Camera>

FIG. 1A is a block diagram illustrating an example of the configuration of a digital camera 100 according to the present exemplary embodiment. In FIG. 1A, a lens unit 200 is a lens unit including an exchangeable imaging lens mounted thereon. An image forming optical system 201 includes a plurality of lenses including a focus lens and a zoom lens, and a diaphragm. A lens system control unit 202 controls the driving of the image forming optical system 201 via a driving circuit 203 and performs communication with the digital camera 100, which is the main body, via a communication terminal 205. A lens identifier (ID) and a lens state such as current imaging conditions (focus position, zoom position, aperture value, etc.) are transmitted to the digital camera 100. A communication terminal 111 is a communication terminal for the digital camera 100 to communicate with the lens unit 200. Further, the lens system control unit 202 communicates with a system control unit 102 of the digital camera 100 via the communication terminals 205 and 111 to control the focus position, zoom position, and diaphragm via the driving circuit 203.

A shutter 112 is a focal plane shutter capable of freely controlling the exposure time of an age capturing portion 101 by the system control unit 102.

The image capturing portion 101 includes an image sensor 1010 composed of a charge-coupled device (CCD) sensor, complementary metal oxide semiconductor (CMOS) sensor, or the like which converts optical images into electric signals. The image sensor 1010 includes a plurality of micro-lenses, and a plurality of photoelectric conversion elements is assigned to each micro-lens. Specifically, light rays from different pupil regions of an exit pupil 204 of an image forming optical system including the image forming optical system 201 enter the respective photoelectric conversion elements located under the micro-lenses. In this way, the signals acquired from the photoelectric conversion elements located under the micro-lenses are signals that are captured from different viewpoints and have parallax from each other. The image capturing portion 101 includes an analog/digital (A/D) conversion device. The analog signals acquired from the image sensor 1010 are converted into digital signals. The image sensor 1010 can include the A/D conversion device as an integrated device on the same chip.

An image processing unit 103 performs various types of processing on data from the A/D conversion device or data from a memory 104. Specific examples of the processing performed by the image processing unit 103 include development processing including correction processing for correcting pixel defects originating from the apparatus that captures images, demosaicing processing, white balance correction processing, and gamma correction processing, color conversion processing, and encoding/compression processing. In the present exemplary embodiment, the development processing refers to the processing including at least some of the above-described processing, and data for an image on which the development processing is not performed will be referred to as raw data. Further, especially in the present exemplary embodiment, the image processing unit 103 includes a distance information generation unit 110, and the distance information generation unit 110 calculates the amount of image displacement based on the phase difference between the images of the plurality of viewpoints acquired from the image sensor 1010. The calculated amount of image displacement is depth information indicating the relative positional relationship of a subject in the depth direction in the images and can be converted, as needed, into a defocus amount using a coefficient (K-value) originating from the image sensor 1010 or the image forming optical system 201 and further into depth information about the subject distance. The depth information for use by the image processing unit 103 is not limited to the foregoing, and the image processing unit 103 can perform various types of image processing using depth information generated and acquired by any other methods.

Further, the image processing unit 103 performs predetermined computation processing using captured image data, and the system control unit 102 performs exposure control and distance measurement control based on the acquired computation result. The image processing unit 103 further performs predetermined computation processing using the captured image data and performs auto white balance (AWB) processing based on the acquired computation result.

The output data from the image capturing portion 101 is written either via the image processing unit 103 or directly to the memory 104. The memory 104 stores the image data that is acquired by the image sensor 1010 and converted into digital data by the A/D conversion device of the image capturing portion 101 and stores the image data that is to be displayed on a display 107 via a display control unit 106. The memory 104 has sufficient storage capacity to store a predetermined number of still images and a predetermined length of time of moving images and audio.

Further, the display control unit 106 can function as an electronic viewfinder and perform through-image displaying (live view displaying) by sequentially transferring and displaying the image data that is output from the image capturing portion 101 and written to the memory 104, to and on the display 107.

The memory 104 includes an electrically erasable and recordable memory. For example, an electrically erasable programmable read-only memory (EEPROM) is used.

Further, the system control unit 102 includes a memory therein and stores constant numbers for operations, programs, etc. As used herein, the term "program" refers to a program for executing a flowchart described below in the present exemplary embodiment.

The system control unit 102 is a control unit including at least one processor and controls the entire digital camera 100. The system control unit 102 executes a program recorded in the system control unit 102 to realize a process described below in the present exemplary embodiment. Each process in the flowcharts illustrating the operations that are described below is to be executed by the system control unit 102 or the units included in the digital camera 100 according to an instruction from the system control unit 102.

An operation unit 105 is an operation input unit for the digital camera 100 (system control unit 102) and the lens unit 200 (lens system control unit 202) to receive operation instructions according to user intentions. Specifically, the operation unit 105 in the present exemplary embodiment includes a mode selection switch, a first shutter switch, a second shutter switch, and a touch panel integrated with the screen of the display 107. The mode selection switch is a switch for changing an operation mode of the system control unit 102 to one of a still image recording mode, a moving image capturing mode, and a reproduction mode. Examples of modes included in the still image recording mode include an auto imaging mode, an auto scene discrimination mode, a manual mode, a diaphragm priority mode (Av mode), and a shutter speed priority mode (Tv mode). Other examples include various scene modes to be the imaging settings for respective imaging scenes, a programmed auto exposure (AE) mode, and a custom mode.

The first shutter switch is turned on when a shutter button of the digital camera 100 is operated to a point before the end, i.e., when the shutter button is half-pressed (imaging preparation instruction), to generate a first shutter switch signal SW1. In response to the first shutter switch signal SW1, operations such as auto focus (AF) processing, AE processing, AWB processing, and pre-flash (EF) processing are started.

The second shutter switch is turned on when the shutter button is operated to the end, i.e., when the shutter button is full-pressed (imaging instruction), to generate a second shutter switch signal SW2. In response to the second shutter switch signal SW2, the system control unit 102 starts a series of operations of imaging processing from the reading of signals from the image capturing portion 101 to the writing of image data subjected to A/D conversion to a recording medium 300 via the image processing unit 103 and an I/F 113 serving as an interface with an external recording medium.

Further, various functional icons displayed on the display 107 are selected and operated on the touch panel of the operation unit 105 and thereby functions are assigned to the display 107 as appropriate for each scene, so that the functional icons act as various function buttons. Examples of the function buttons include an end button, a return button, an image transmission button, a jump button, a narrow-down button, and an attribute change button. For example, a menu screen via which various settings can be made is displayed on the display 107 at the press of a menu button. This enables a user to intuitively set various settings by using the menu screen displayed on the display 107, four-direction buttons including up, down, right, and left buttons, and a set button.

The operation unit 105 further includes various operation members as an input unit for receiving user operations. The operation unit 105 includes at least the following operation portions, a main electronic dial, a power switch, a sub-electronic dial, a cross key, a set button, a live-view (LV) button, an enlargement button, a reduction button, and a reproduction button.

A vibration detection unit 108 includes an acceleration sensor and a gyro sensor and detects the orientation of the digital camera 100 with respect to the gravity direction and detects vibrations. Whether an image captured by the image capturing portion 101 is an image that is captured with the digital camera 100 held in the landscape orientation or an image that is captured with the digital camera 100 held in the portrait orientation is discriminable based on the orientation detected by the vibration detection unit 108.

Further, the system control unit 102 performs optical image stabilization to prevent image vibrations by driving the image forming optical system 201 or the image sensor 1010 based on the amount of vibration detected by the vibration detection unit 108. Further, the system control unit 102 performs electronic image stabilization to reduce image vibrations by detecting an image vibration (rotation vibration, tilt, roll vibration, defocus, etc.) between the image signals using image signals, cutting the image signals, and performing geometric deformation on the cut image signals. The optical image stabilization and the electronic image stabilization are used in combination as needed.

In the present exemplary embodiment, a plurality of pieces of distance information is calculated by the image processing unit 103 based on a plurality of image signals captured in time series by the image capturing portion 101. At this time, information about the vibrations detected from the image signals by the vibration detection unit 108 or the system control unit 102 can be used as auxiliary information for correcting the distance information using geometric deformation, etc. Further, the plurality of pieces of distance information calculated by the image processing unit 103 is used in image processing such as background blurring and rewriting performed by the image processing unit 103 based on the depth of the subject. Further, the plurality of pieces of distance information is used by the system control unit 102 and the lens system control unit 202 in focus control (automatic focus position adjustment), zoom control (automatic zoom position adjustment), and aperture control using the driving circuit 203 via the communication terminals 205 and 111.

FIG. 1B is an x-y cross sectional view illustrating the image sensor 1010. The image sensor 1010 is composed of a plurality of two-by-two image capturing pixel groups 150 and a plurality of two-by-two distance measurement pixel groups 160 arranged therein. Each image capturing pixel group 150 is composed of green pixels 150G1 and 150G2, a red pixel 150R, and a blue pixel 150B. The green pixels 150G1 and 150G2 are arranged in a diagonal direction, and the red pixel 150R and the blue pixel 15013 are arranged in the remaining two pixels. The image capturing pixel group 150 outputs an image signal (third image signal) for detection which contains color information about the three colors, blue, green, and red. The color information about the three colors, however, is not essential. For example, a configuration from which a signal of a complementary color, near-infrared information, etc. are acquirable or a configuration consisting of luminance information with no color information can be employed. While only the case of the color information about the three colors of blue, green, and red is described below as an example, the description is also applicable to a case of using other color information. Further, each distance measurement pixel group 160 is composed of first distance measurement pixels 161 and second distance measurement pixels 162. The first distance measurement pixels 161 are arranged in the diagonal direction, and the second distance measurement pixels 162 are arranged in the remaining two pixels. The first and second distance measurement pixels 161 and 162 of the distance measurement pixel group 160 output first and second image signals which are image signals for distance measurement. While the first and second distance measurement pixels 161 and 162 are described as pixels for distance measurement because the first and second image signals are for use in distance measurement in the present exemplary embodiment, the use of the first and second image signals is not limited to the distance measurement, and the first and second image signals can be used in subject detection, exposure control, etc. Further, while the pixels for the images signals for detection and the pixels for the signals for distance measurement are different pixels in the present exemplary embodiment, a color filter can be placed on the distance measurement pixels to use the distance measurement pixels as both the pixels for the image signals for detection and the pixels for the image signals for distance measurement.

FIG. 2A is an I-I' cross sectional view schematically illustrating the image capturing pixel group 150. Each pixel includes a light guiding layer 154 and a light receiving layer 155. In the light guiding layer 154 are placed micro-lenses 151, color filters 152, and wiring (not illustrated) for image reading and pixel driving. The micro-lenses 151 are provided to efficiently guide light rays incident on the pixels to photoelectric conversion portions 153. The color filters 152 transmit the light of a predetermined wavelength band. The color filters 152 have three types, blue, green, and red, and the spectral sensitivities of the blue pixel 150B, the green pixels 150G1 and 150G2, and the red pixel 150R have characteristics as illustrated in FIG. 2B. In the light receiving layer 155 are placed the photoelectric conversion portions 153 for photoelectrically converting received light. FIG. 2C is a J-J' cross sectional view schematically illustrating the distance measurement pixel group 160. In the light receiving layer 155 are placed the photoelectric conversion portions 153. In a light guiding layer 164 are placed the micro-lenses 151, a light blocking portion 163, and the wiring (not illustrated) for image reading and pixel driving. The micro-lenses 151 are provided to efficiently guide light rays incident on the pixels to the photoelectric conversion portions 153. The light blocking portion 163 is provided to limit the light to enter the photoelectric conversion portions 153. To increase the amount of received light, no color filter is placed on the distance measurement pixel group 160. The spectral sensitivities of the first and second distance measurement pixels 161 and 162 have spectral sensitivity characteristics that are the product of the spectral sensitivities of the photoelectric conversion portions 153 and an infrared cut filter. FIG. 2D illustrates the spectral sensitivities of the first and second distance measurement pixels 161 and 162, and the first and second distance measurement pixels 161 and 162 have spectral sensitivities similar to the sum of the spectral sensitivities of the blue pixel 150B, the green pixel 150G1, and the red pixel 150R.

<Principle of Image Capturing Surface Phase Difference Distance Measurement Method>

The light rays received by the first and second distance measurement pixels 161 and 162 of the image sensor 1010 in the present exemplary embodiment will be described below with reference to FIG. 3A.

FIG. 3A schematically illustrates the exit pupil 204 of the image forming optical system 201 and the first and second distance measurement pixels 161 and 162 in the image sensor 1010. The micro-lens 151 illustrated in FIG. 3A is disposed such that the exit pupil 204 and the light receiving layer 155 have an optically conjugate relationship with each other. The light rays having passed through the exit pupil 204 of the image forming optical system 201 are converged by the micro-lens 151 and guided to the photoelectric conversion portion 153, but part of the light is blocked by the light blocking portion 163 in the light guiding layer 164. Consequently, as illustrated in FIG. 3A, the photoelectric conversion portion 153 of the first distance measurement pixels 161 mainly receives the light rays that have passed through a first pupil region 310 in the exit pupil 204. Further, the photoelectric conversion portion 153 of the second distance measurement pixels 162 mainly receives the light rays that have passed through a second pupil region 320 in the exit pupil 204.

The plurality of first distance measurement pixels 161 of the image sensor 1010 mainly receives the light rays that have passed through the first pupil region 310, and outputs a first image signal. Further, at the same time, the plurality of second distance measurement pixels 162 of the image sensor 1010 mainly receives the light rays that have passed through the second pupil region 320, and outputs a second image signal. The intensity distribution of an image formed on the image sensor 1010 by the light rays that have passed through the first pupil region 310 is acquirable from the first image signal. Further, the intensity distribution of an image formed on the image sensor 1010 by the light rays that have passed through the second pupil region 320 is acquirable from the second image signal.

Figure 3B:
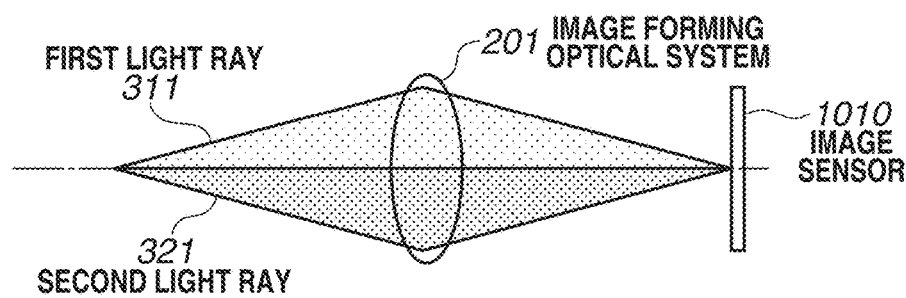
Figure 3C:
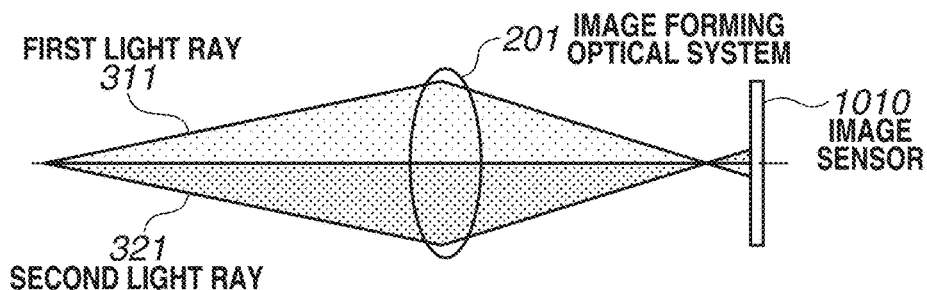
Figure 3D:
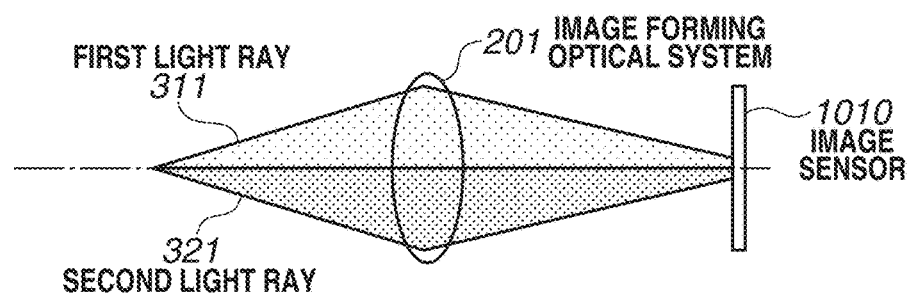

The amount of relative image position shift (so-called "amount of parallax") between the first and second image signals is a value corresponding to a defocus amount. The relationship between the amount of parallax and the defocus amount will be described below with reference to FIGS. 3B, 3C, and 3D. FIGS. 3B, 3C, and 3D schematically illustrate the image sensor 1010 and the image forming optical system 201 in the present exemplary embodiment. In FIGS. 3B, 3C, and 3D, a first light ray 311 denotes first light rays that pass through the first pupil region 310, and a second light ray 321 denotes second light rays that pass through the second pupil region 320.

FIG. 3B illustrates a focused state in which the first light ray 311 and the second light ray 321 are converged on the image sensor 1010. At this time, the amount of parallax between the first image signal formed by the first light ray 311 and the second image signal formed by the second light ray 321 is zero. FIG. 3C illustrates a state of defocus in the negative direction of the z-axis on the image side. At this time, the amount of parallax between the first image signal formed by the first light ray 311 and the second image signal formed by the second light ray 321 is not zero but a negative value. FIG. 3D illustrates a state of defocus in the positive direction of the z-axis on the image side. At this time, the amount of relative image position shift between the first image signal formed by the first light ray 311 and the second image signal formed by the second light ray 321 is not zero but a positive value.

From a comparison between FIGS. 3C and 3D it is understood that the direction of the positional shift changes depending on whether the defocus amount is positive or negative. Further, it is also understood that a positional shift according to the image forming relationship (geometric relationship) of the image forming optical system 201 occurs based on the defocus amount. The amount of parallax which is the positional shift between the first image signal and the second image signal is detectable by a region-based matching method described below.

<Description of Distance Information Generation Unit 110>

The distance information generation unit 110 of the image processing unit 103 in the present exemplary embodiment will be described below. FIG. 4A is a block diagram schematically illustrating the configuration of the distance information generation unit 110 in the present exemplary embodiment. FIG. 4B is a flowchart illustrating the operations of the distance information generation unit 110. FIG. 4C is a flowchart illustrating the distance information correction processing in step S440.

In the distance information generation unit 110, subject information Isi is generated by a subject detection unit 410. Distance information Ird is generated by a distance information generation unit 411, and the subject information Isi and the distance information Ird are combined together, and distance information Isp corresponding to the detected known-shape subject is extracted by an extraction unit 412. The distance information Ird is corrected by a distance information correction unit 413 using the distance information Isp corresponding to the subject to generate corrected distance information Icd.

The following describes details of the processing performed by the subject detection unit 410, the distance information generation unit 411, the extraction unit 412, and the distance information correction unit 413.

Figure 5A:
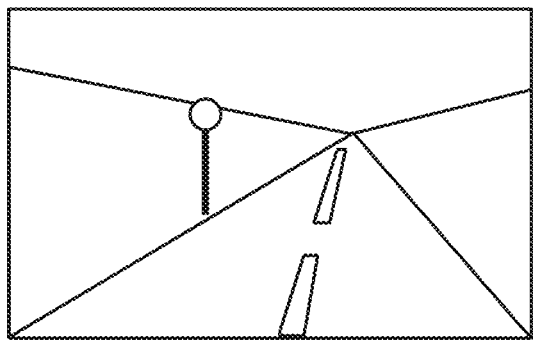
FIGS. 5A, 5B, 5C, and 5D illustrate an example of a subject extracted by a known shape extraction unit according to the first exemplary embodiment.
Figure 5B:
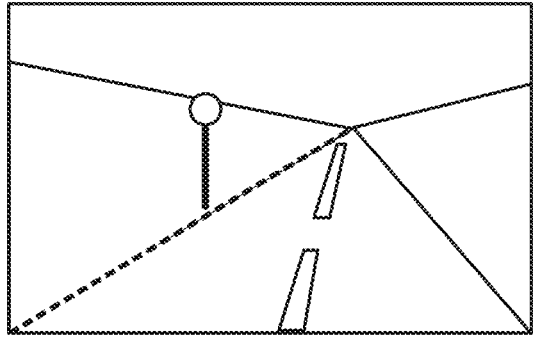
Figure 5C:
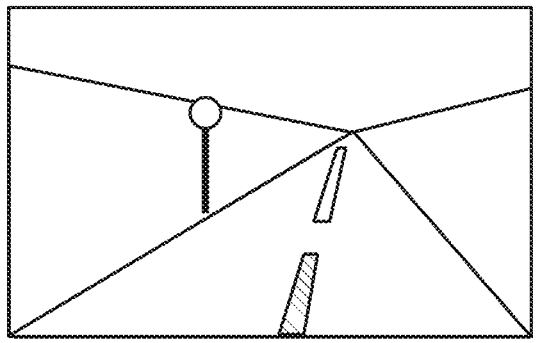
Figure 5D:
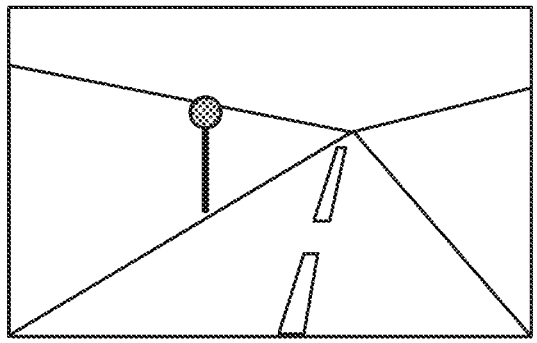

The subject detection unit 410 acquires an image signal S1 for detection from either the image sensor 1010 or the memory 104 and performs subject detection processing in step S410 to generate the subject information Isi. An example of the subject detection processing in step S410 will be described below with reference to FIGS. 5A, 5B, 5C, and 5D. The entire image in FIG. 5A represents an image of the acquired image signal S1 for detection. In the subject detection processing in step S410, the position of each pixel of a known-shape subject portion is detected from the image signal S1 for detection. First, extraction of a line segment as a known-shape subject will be described below. Any line segment extraction method can be used and, for example, the Hough transform can be used to extract a line segment from the image signal S1 for detection, based on the assumption that distorted aberration of the image forming optical system 201 in the image signal S1 for detection is corrected in advance. In FIG. 5B, a portion of a roadside is displayed as an extracted line segment (dotted-line portion). A line in a luminance image in which distorted aberration is corrected is likely to be a line even in a three-dimensional space and can be considered as a known-shape. While one line segment is illustrated in FIG. 5B, a plurality of line segments is extracted in the cases where there is a plurality of amounts of change on the image side or in the cases where the robustness is to be increased. Further, it is desirable to select a line segment that is longer (has a greater number of extracted pixels) and has a greater depth difference than the others in the screen in order to evaluate the linearity of the line segment at the time of estimating the amount of change on the image side. Further, a line segment including a greater number of pixels with high reliability of the distance information acquired by the distance information generation unit 411, which will be described below, is desirable. Next, extraction of a flat surface portion or other Objects as a known-shape subject will be described below. For example, semantic segmentation is used. The semantic segment is a method in which a known-shape portion in the image signal S1 for detection is recognized and the region is extracted. While various methods are available, a method of learning in advance from a database and performing identification is commonly used. In recent years, deep learning is used to perform highly-accurate identification. FIG. 5C illustrates the case where a white line is recognized, as an example, and. FIG. 5D illustrates the case where a traffic sign is recognized (the white line and the traffic sign are both displayed in oblique lines), as an example. Since the sizes, etc. of the white line and the traffic sign are fixed, this information can also be used in the correction processing. The known-shape subject can be anything that has a known shape, such as a road surface, a person, a car, or a wall or a floor in the cases of the inside of a room, besides those specified above. Further, it is desirable to select a subject that has a greater number of extracted pixels and a greater depth difference than the others in the screen and has a higher reliability of the distance information than the others, as in the line segment detection. Predetermined criteria can be set in advance with respect to the indexes of the number of pixels to be extracted, the depth difference, and the reliability, and information for correction can be acquired from those that exceed the criteria.

The distance information generation unit 411 acquires a first image signal S2 and a second image signal S3 from either the image sensor 1010 or an image signal storage unit. The distance information generation unit 411 performs distance information generation processing in step S420 to generate the distance information Ird which indicates the subject distance. In the following description, a defocus amount is generated as the distance information Ird, and details of the distance information generation processing in step S420 will be described below with reference to FIG. 4C.

In step S421, the distance information generation unit 411 corrects the amounts of light of the first and second image signals S2 and S3. At viewing angles near the image forming optical system 201 (region where the image height is high), the balance of the amount of light between the first and second image signals S2 and S3 is lost by vignetting due to the difference in shape between the first and second pupil regions 310 and 320. In step S421, the amounts of light of the first and second image signals S2 and S3 are corrected using an amount-of-light correction value stored in the memory 104. It is not always required to use the amount-of-light correction value stored in the memory 104 and, for example, in step S421, the amount-of-light correction value can be generated from the area ratio between the first and second pupil regions 310 and 320 and then the amount-of-light correction can be performed. Further, there can be cases where the amount-of-light correction is not performed with respect to an optical system that the effect of vignetting is small and with respect to a region near the center of the viewing angle where the image height is low.

In step S422, noise reduction processing is performed to reduce the noise added by the image sensor 1010. Specifically, filter processing using a band-pass filter is performed on the first and second image signals S2 and S3. In general, a high-frequency region with a higher spatial frequency has a lower signal-to-noise (SN) ratio (the ratio between signal and noise components) to contain relatively more noise components. Thus, a so-called low-pass filter having a lower transmission rate with respect to higher frequencies can be used. The amount-of-light correction in step S421 does not always follow a design value due to manufacture errors in the image forming optical system 201, etc. Thus, it is desirable to use a band-pass filter that has a transmission rate of zero with respect to direct-current components (components with a spatial frequency=0) and has a low transmission rate with respect to high-frequency components.

In step S423, the distance information generation unit 411 calculates the amount of shift in image position (amount of parallax) between the first and second image signals S2 and S3. Specifically, the distance information generation unit 411 sets a point of interest corresponding to representative pixel information Isp in the first image signal S2 and sets a checking region with the point of interest being the center of the checking region. The checking region is, for example, a rectangle with the point of interest being the center of the rectangle and each side including predetermined pixels. Further, the shape can be changed. Next, the distance information generation unit 411 sets a reference point in the second image signal S3 and sets a reference region with the reference point being the center of the reference region. The reference region has the same size and shape as the checking region. The distance information generation unit 411 calculates the correlation between the first image signal S2 in the checking region and the second image signal S3 in the reference region while sequentially moving the reference point, and determines the reference point having the highest correlation, as a corresponding point that corresponds to the point of interest. The amount of shift in relative position between the point of interest and the corresponding point is the amount of parallax at the point of interest. The distance information generation unit 411 can calculate the amount of parallax at a plurality of pixel positions by calculating the amount of parallax while sequentially changing the point of interest according to the representative pixel information Isp. To calculate the correlation, a publicly-known method can be used. For example, a method called "normalized cross-correlation" (NCC) can be used in which the normalized cross-correlation between image signals is evaluated. Further, a sum-of-squared-difference (SSD) method can be used in which the sum of squared differences between image signals is evaluated. Further, a sum-of-absolute-difference (SAD) method can be used in which the sum of absolute differences is evaluated. In the cases of a method using any of the foregoing correlations, the reliability of calculated distance information can be generated using the texture amount of each pixel block and/or frequency component information. This is used in selecting subject detection. In the cases where the reliability of distance information is to be generated at the time of subject detection, the distance information generation processing in step S420 may be performed prior to the subject detection processing in step S410.

In step S424, the distance information generation unit 411 transforms the amount of parallax into a defocus amount which is the distance from the image sensor 1010 to the focal point of the image forming optical system 201, using a predetermined transformation coefficient. The amount of parallax d can be transformed into the defocus amount ΔL using a formula (1) below $$\Delta L = K \times d \quad (1)$$

where K is the predetermined transformation coefficient, ΔL is the defocus amount, and d is the amount of parallax.

The distance information generation processing in step S420 is performed with respect to a plurality of pixel positions to generate the distance information Ird containing the defocus amounts at the plurality of pixel positions as a defocus map.

In step S425, known-error correction is performed on the distance information Ird as needed. Especially correction processing on error factors that do not change over time is performed. Since the error factors that do not change over time have many causes, correction processing other than those described below can also be performed.

In the present exemplary embodiment, a design-originating error, a calculation-originating error, a subject-originating error, and a manufacture assembly error will be described. The design-originating error is an error caused by a change that occurs in the viewing angle especially due to image surface curvature, vignetting, and/or one or more of various aberrations in optical design. The design-originating errors are correctable by using design data. For example, correction data can be calculated in advance from design data with respect to each object distance and each viewing angle. The calculation-originating error occurs in steps S421 to S424 described above. As to the calculation-originating error, an attempt is made to increase the accuracy as much as possible in each step, and as to a residual error, for example, spatial filtering processing can be performed on the distance information to reduce a variation error. The subject-originating error occurs depending on the contrast and color of the subject. The subject-originating error needs to be corrected according to design information in response to the image signal S1 for detection. For example, the effect of axial chromatic aberration in the image forming optical system 201 changes the defocus amount ΔL according to the color of the subject. The manufacture assembly error occurs during manufacture assembly and vary depending on each product. Thus, for the correction, correction data is generated for each item by capturing actual images, or the like.

Figure 6A:
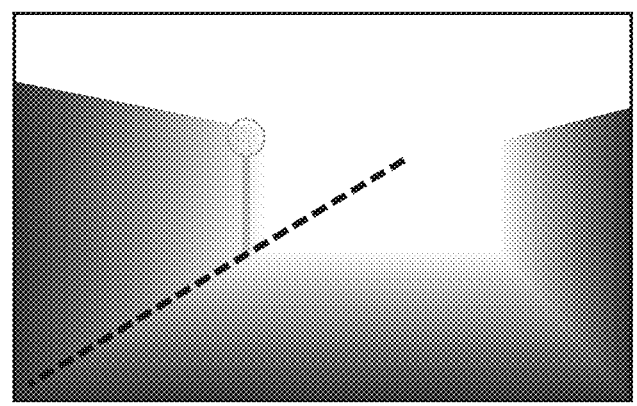
FIGS. 6A, 6B, and 6C illustrates an example of distance information generated by a distance information generation unit according to the first exemplary embodiment.

The extraction unit 412 extracts distance information corresponding to the subject information Isi from the distance information Ird. As described above, the subject information Isi can be any information that has a known shape, and in the present exemplary embodiment, a result of line segment extraction is described as a representative example. FIG. 6A illustrates an example of the distance information Ird generated by the distance information generation unit 411. The distance information Ird is the defocus amount ΔL as described above in the description of step S424. The defocus amount ΔL can be transformed into object distance information from the lens formula in geometric optics, $$\frac{1}{A} + \frac{1}{B} = \frac{1}{F}. \quad (2)$$

In formula (2), A is the distance from the object surface to a principal point of the image forming optical system 201, B is the distance from the principal point of the image forming optical system 201 to the image surface, and F is the focal length of the image forming optical system 201.

In formula (2), the value of B is calculable from the defocus amount ΔL, and the focal length is known, so that the distance A to the object surface is calculable.

Figure 6B:
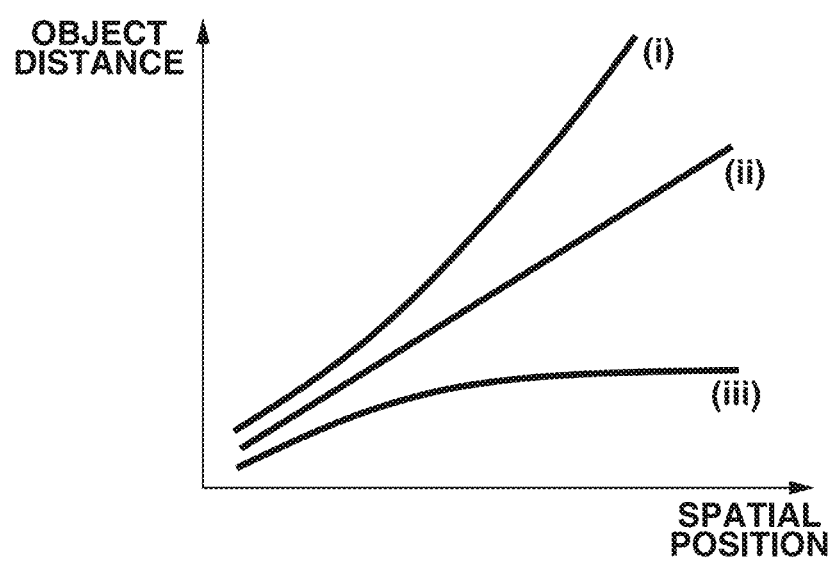

In the case where a line segment (known-shape subject) is extracted from the image signal S1 for detection as illustrated in FIG. 5B, object distance information (subject corresponding distance) corresponding to the equivalent position is extracted and calculated (step S430, dotted line portion in FIG. 6A). In the cases where there are no temporal errors, a graph that represents changes in distance with respect to the spatial position in the color image S1 is as specified by a line segment (ii) in FIG. 6B. On the other hand, in the cases where a temporal error occurs due to the effect of heat, vibration, or the like to change, for example, the distance between the image forming optical system 201 and the image sensor 1010 in the z-direction, the obtained graph is not a line segment but as specified by a line (i) and a line (iii) in FIG. 6B. Thus, the errors become significant unless corrected. This occurs as a result that the transformation relationship between the defocus and the object distance is lost due to a difference that arises between an expected image surface position and the actual image sensor position of the image forming optical system 201 in formula (2). The amount of change on the image side that originates from a change in the positional relationship between the image forming optical system 201 and the image sensor 1010 will be referred to as "image-side change amount". Even in the case where the image-side change amount arises, the relationship follows formula (2), so that it is considered that the relationship is a line segment if the amount of error is correctly estimated and an object distance corrected based on the amount of error is calculated. Using this relationship, the image-side change amount is estimated from the distance information corresponding to the subject and the entire distance information is corrected in step S440. While the amount of change (shift component) at the expected image surface position and the image sensor position in the z-axial direction is described as an example of the image-side change amount in the present exemplary embodiment, a difference from the default position in the x- or y-axial direction or an x-, y-, or z-axial rotation amount (rotation component) from the default position can be determined as the image-side change amount. Further, a change in image forming position (change in focal length, principal point position, or the like) due to a change in inter-surface distance, surface shape, or refractive index of the image forming optical system 201 can be determined as the image-side change amount. Further, a change due to an image height that cannot be expressed by a primary component, such as a sensor distortion, is not taken into consideration so that the amount of calculation is reduced and a stable result is obtained.

Depending on the variable numbers of the image-side change amount to be considered, the number of known-shape subjects to be detected can be required to be more than one. Further, even if the image-side change amount is one, the estimation may be performed based on the distance information about a plurality of known-shape subjects. In this way, the accuracy and robustness in the estimation of the image-side change amount in step S440 are increased.

In the distance information correction processing in step S440 in FIG. 4B, the distance information correction unit 413 estimates the image-side change amount from the distance information Isp corresponding to the subject and corrects the distance information Ird to acquire the corrected distance information Icd. Details of the distance information correction processing in step S440 will be described below with reference to FIG. 4D.

Figure 6C:
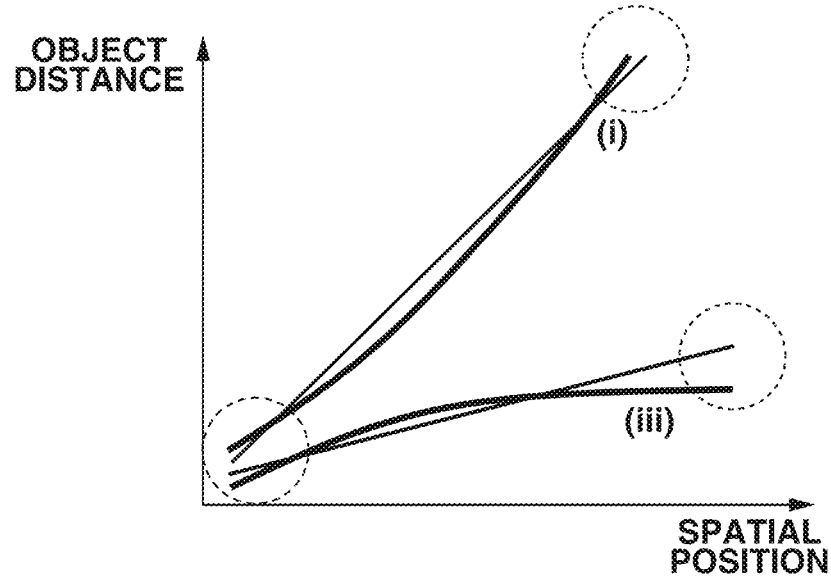

In step S441 the matching level of the object distance information transformed from the distance information corrected using the estimated image-side change amount (the initial value is zero) with respect to the known shape is evaluated. Specifically, the shape formed at the object distance by the distance information corresponding to the known-shape subject is compared with the shape formed by the detected subject. The shape used here is a set of points in an XYZ three-dimensional space. In the present exemplary embodiment, the case will be described in which there is one image-side change amount and the line segment is extracted as a known-shape subject, as in the case described above. A target is to estimate an image-side change amount from the state (i) or (iii) to change to the state (ii) in FIG. 6B. As used herein, the term "matching level" refers to an index that indicates the similarity of the object distance information transformed from the corrected distance information with respect to the known shape (which is a line segment in the present exemplary embodiment). Any method can be used to calculate the matching level. For example, if data such as data (i) and data (iii) in FIG. 6C is available, line segment fitting is performed on the data (thin lines in FIG. 6C), and the linearity of the resulting data is evaluated. Specifically, the line segments are compared with the short-distance side data and the great-distance side data (portions specified by dotted-line circles in FIG. 6C) to judge whether the curve is convex upward or downward based on the magnitude relationship. This state can be defined as the matching level. In the cases of a known shape other than the line segment, known-shape fitting is performed to acquire the matching level similarly using characteristic nearby data. Further, in the cases where there is a plurality of line segments or known shapes, the matching level with respect to a plurality of pieces of data is calculated. Further, while it is acceptable to use only one point on the short distance side or the great distance side in the comparison with the fitting data, since the distance information Ird can contain an error, it is desirable to judge the matching level using a plurality of points.

In step S442, the matching level of the distance information corrected using the estimated image-side change amount is evaluated. If the matching level is equal to or more than a threshold value and it is judged that the corrected distance information is sufficiently close to the line segment or the known shape (YES in step S442), it is determined that the current final image-side change amount is calculated as the correction parameter, and the processing proceeds to step S444 of entire distance information correction processing. On the other hand, if the matching level is lower than the threshold value and it is judged that there is a significant difference from the line segment or the known shape (NO in step S442), the processing proceeds to step S443 in which the image-side change amount is adjusted to reduce the difference. Further, it is also possible to make a judgement to perform the entire distance information correction processing in step S444 if an adjustment of the image-side change amount no longer improves the matching level. Similarly, the judgment can be made if the amount of update of the image-side change amount becomes sufficiently small. In the cases where there is a plurality of line segments (known shapes), it is desirable to consider all the matching levels in setting the threshold value or in judging the presence/absence of improvement. For example, optimization can be performed with each known shape weighted based on information such as the amount of change in distance, the number of pixels, and reliability. Further, the number of times steps S441 to S443 are to be repeated can be predetermined, and the processing can proceed to step S444 if steps S411 to S443 are repeated the predetermined number of times.

In step S443, the estimated value of the image-side change amount is changed. Thereafter, the matching level is calculated again in step S441, and this is repeated to determine the final estimated value of the image-side change amount. As to a method of changing the image-side change amount, an amount of change is predetermined, and the predetermined amount of change is added or subtracted toward improvement. To reduce the number of repeats while improving the convergence value, feedback control such as proportional-integral-differential (PID) control can be used. In the cases of changing a plurality of image-side change amounts, an individual improvement does not always lead to an entire improvement, so that an algorithm of a gradient method such as a gradient descent method can be used. This method, however, can produce only a local solution, so that another method whereby a global optimal solution is produced can be used. The method of estimating the image-side change amount is not limited to the processing from step S441 to step S443, and any method capable of adjusting the object distance information even closer to a known shape can be used.

In step S444, the distance information about all or part of the screen is corrected using the finally-estimated image-side change amount as the correction parameter. Specifically, the current positions of the image forming optical system 201 and the image sensor 1010 are determined from the estimated image-side change amount and transformed into object-side distance information using formula (2). The image-side change amount is estimated using the distance information corresponding to the known-shape subject in the processing from step S441 to step S443, and since the image-side change amount is estimated, the distance information about the outside of the subject region becomes also correctable. Further, the finally-estimated image-side change amount (correction parameter) is stored in the memory 104 and is also applied to the distance information about other image capturing images.

While the form in which the image-side change amount is calculated and the distance information is corrected using the calculated image-side change amount is described in the present exemplary embodiment, a parameter table, for example, can be prepared instead of calculating the image-side change amount to generate corrected distance information by directly correcting the distance information calculated by a distance information calculation unit.

Further, in the cases where the information about a captured image is in color, correction corresponding to axial chromatic aberration can be performed using the color information about the detected subject. Since the axial chromatic aberration is a difference in image forming position due to wavelengths, the above description using formula (2) is applicable. For example, in the cases where the color of a detected subject is green, an image-side change amount suitable for the green wavelength is estimated. In the cases where there is a red or blue region outside the detected subject, correction is performed with the chromatic aberration on the short-wavelength side and the chromatic aberration on the long-wavelength side taken into consideration.

As described above, the distance information generation unit 110 in the present exemplary embodiment detects a known-shape subject such as a line segment from the image signal S1 for detection and estimates the image-side change amount using the object distance information about the corresponding region to adjust the known-shape subject such as a line segment. The image-side change amount is used so that temporal error caused by a change in the relationship between the image forming optical system 201 and the image sensor 1010 that is likely to be generated by external environments such as heat and vibration is reduced to increase the accuracy of the distance information and the object distance information. Further, correction can be performed in one frame, and the error is correctable even if the error is significant. The image-side change amount is estimated to enable correction of not only a partial portion but also the entire region of the simultaneously-acquired distance information.

The digital camera 100 in the present exemplary embodiment provides feedback for use in, for example, an AF function with greater accuracy to the image forming optical system 201 and the image sensor 1010 using the acquired image-side change amount. The movement amount corresponding to the corrected distance at a viewing angle is calculated by at least one of the lens system control unit 202 and the system control unit 102, and the image forming optical system 201 or the image sensor 1010 is moved by at least one of the driving circuit 203 and the image capturing portion 101. The digital camera 100 can acquire the distance information with reduced temporal errors, and this enables more accurate focusing by one feedback. Further, since highly-accurate image sensing field information is acquirable using the corrected distance information Icd, optimal strobe imaging can be performed using a strobe (not illustrated).

Further, utilization as an information acquisition unit for enabling a robot or vehicle capable of autonomously generating an action plan to recognize an external environment is possible. An external environment recognition unit (not illustrated) performs transformation into external environment recognition data using the acquired corrected distance information Icd. An action plan generation unit (not illustrated) generates an action plan based on the external environment recognition data and an aim provided in advance. An actuator control unit (not illustrated) configured to control an actuator (not illustrated) and the actuator realize autonomous movements according to the action plan. The actuator includes an engine motor, an electric motor, a tire, and a leg mechanism. Being able to acquire the distance information with reduced temporal errors and the image signals for detection, the digital camera 100 is able to perform stable recognition of the external environment.

Further, the form is described in the present exemplary embodiment in which the distance information is generated using the first and second image signals captured from a single set of different viewpoints captured at a timing, the correction parameter (final image-side change amount) is calculated, and the distance information is corrected. Alternatively, in the cases of a plurality of pieces of distance information acquired from a plurality of sets of first and second image signals captured in time series and sequentially acquired, a shared correction parameter can be used with respect to the plurality of pieces of distance information instead of calculating the correction parameter each time and correcting each piece of distance information. This is allowed because if the effect of temporal errors is small, a change in the correction parameter is significantly small and has only an effect on the distance accuracy that is insignificant so that the updating is unnecessary. The shared correction parameter may be, for example, a correction parameter based on the first one of the plurality of sets of first and second image signals in time series or a statistical value of the correction parameters based on some of the plurality of sets of first and second image signals.

Further, in an alternative configuration, the correction parameter may be calculated and stored in the memory 104 each time a predetermined number of pieces of distance information are generated (or each time a predetermined number of sets of image signals are acquired) so that the correction parameter is updated when a period of time passes during which the temporal errors have an effect.

Further, the significance of the effect of temporal errors can be judged directly based on the image-side change amount to judge whether to update the correction parameter. Specifically, if the image-side change amount estimated from the distance information corresponding to the subject that is sequentially generated is not less than a predetermined reference level, a new correction parameter is stored in the memory 104. On the other hand, if the estimated image-side change amount is less than the reference level, the latest correction parameter that is currently stored in the memory 104 is used in correcting the distance information.

The present exemplary embodiment is realizable also by supplying, to a distance measurement apparatus, a storage medium that stores the program codes of software for realizing the above-described functions of the exemplary embodiment. A computer (or central processing unit (CPU), micro-processor unit (MPU), etc.) of a calculation unit reads the program codes stored in the storage medium and executes the above-described functions. In this case, the program codes read from the storage medium realize the above-described functions in the present exemplary embodiment, and the program and the storage medium storing the program constitute the present exemplary embodiment. Installation of the program in the present exemplary embodiment into a computer of an image capturing apparatus including a predetermined image forming optical system, a predetermined image capturing portion, and a computer enables the image capturing apparatus to perform distance detection with great accuracy. The program in the present exemplary embodiment is distributable via the Internet besides the storage medium.

The following describes a second exemplary embodiment of the present disclosure in detail with reference to FIGS. 7A, 7B, 8A, 8B, and 8C. While a digital camera will be described below as an example of an image capturing apparatus including a distance information generation device according to the present exemplary embodiment, applications of present exemplary embodiment are not limited to the digital camera. Further, in the descriptions with reference to the drawings, the same reference numerals are basically used with respect to similar portions across the drawings of different drawing numbers to avoid as many duplicates as possible.

The digital camera 100 in the present exemplary embodiment includes an image sensor 7010 in place of the image sensor 1010 compared with the first exemplary embodiment (FIGS. 1A and 1B). Further, the image processing unit 103 includes a distance information generation unit 810 in place of the distance information generation unit 110. The distance information generation unit 810 can be configured using a logic circuit. Alternatively, the distance information generation unit 810 can be configured using a CPU and a memory configured to store a computation processing program.

<Configuration of Image Sensor>

The image sensor 7010 is an image sensor that includes a CMOS sensor or CCD sensor and has a distance measurement function based on an image capturing surface phase difference distance measurement method. A subject image formed on the image sensor 7010 via the image forming optical system 201 is photoelectrically converted by the image sensor 7010 to generate an image signal based on the subject image. An image generation unit performs development processing on the acquired image signal to generate an image signal for viewing. Further, the generated image signal for viewing can be stored in the image signal storage unit. The following describes the image sensor 7010 in the present exemplary embodiment in more detail with reference to FIGS. 7A and 7B.

Figure 7A:
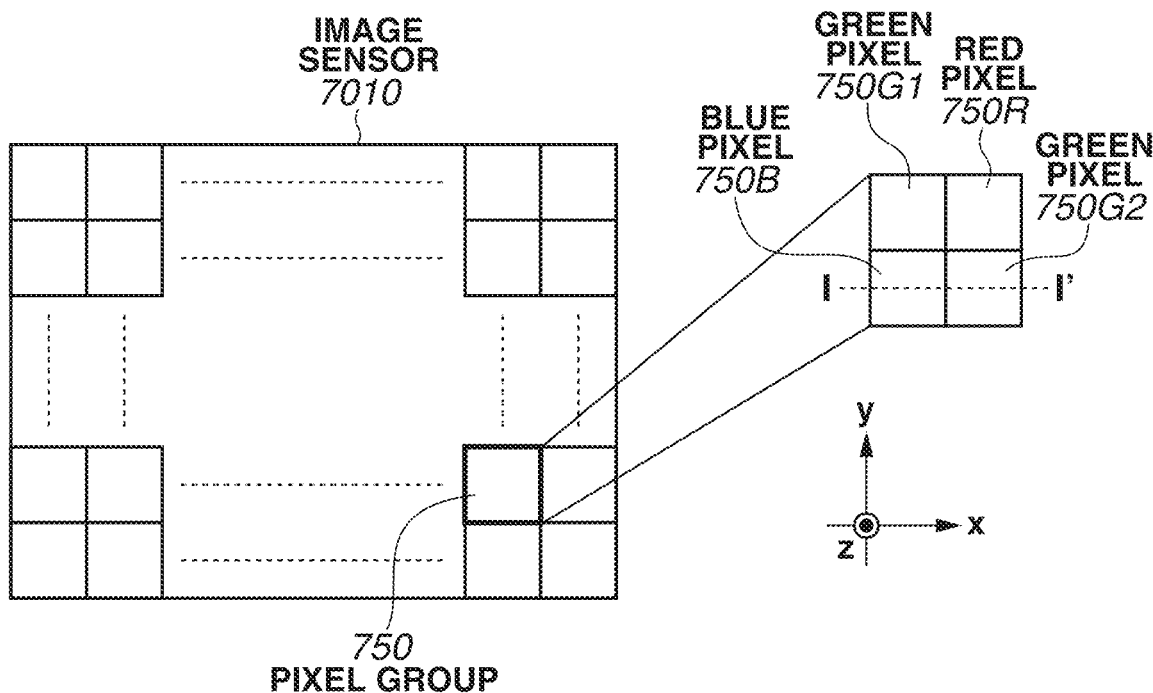
FIGS. 7A and 7B illustrate the image sensor portion of the image capturing apparatus according to a second exemplary embodiment.

FIG. 7A is an x-y cross sectional view illustrating the image sensor 7010. In the image sensor 7010 in FIG. 7A, a plurality of two-by-two pixel groups 750 is arranged. In each of the pixel groups 750, green pixels 750G1 and 750G2 are placed in the diagonal direction, and a red pixel 750R and a blue pixel 750B are placed in the remaining two pixels. The placement and colors, however, are not limited to those described above, and a configuration that possesses color information in any form or a configuration in which all pixels are single-color pixels (including a configuration with no color filter) may be employed. The following describes a case of the above-described condition in more detail.

Figure 7B:
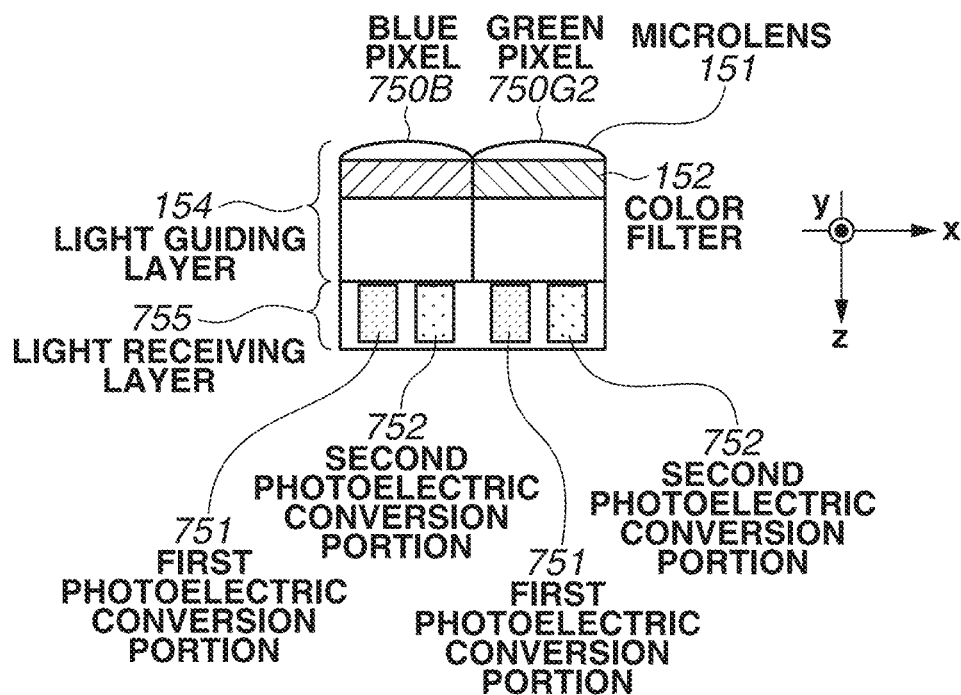

FIG. 7B is an I-I' cross sectional view schematically illustrating the pixel group 750. In each pixel, a light receiving layer 755 is provided with two photoelectric conversion portions (first and second photoelectric conversion portions 751 and 752) for photoelectrically converting received light. The micro-lens 151 is placed such that the exit pupil 204 and the light receiving layer 755 have an optically conjugate relationship with each other. Consequently, the first photoelectric conversion portion 751 mainly receives a first light ray 311, whereas the second photoelectric conversion portion 752 mainly receives a second light ray 321.

The first photoelectric conversion portion 751 photoelectrically converts the received light ray to generate an electric signal. Similarly, the second photoelectric conversion portion 752 photoelectrically converts the received light ray to generate an electric signal. The third image signal is generated by a set of electric signals generated by the first photoelectric conversion portions 751 of the pixels of the image sensor 7010, Similarly, a fourth image signal is generated by a set of electric signals generated by the second photoelectric conversion portions 752 of the pixels of the image sensor 7010. The intensity distribution of an image formed on the image sensor 7010 by the first light ray 311 is acquirable from the third image signal, and the intensity distribution of an image formed on the image sensor 7010 by the second light ray 321 is acquirable from the fourth image signal. Further, since the pixel group 750 includes a color filter corresponding to the blue, green, and red wavelength regions, the third and fourth image signals contain the three types of color information. Specifically, in the image sensor 7010 in the present exemplary embodiment, each pixel includes both the image capturing function and the distance measurement function. Thus, one or more of the first to fourth image signals can be used as the image signal S1 for detection.

<Description of Distance Information Generation Unit 810>

Figure 8A:
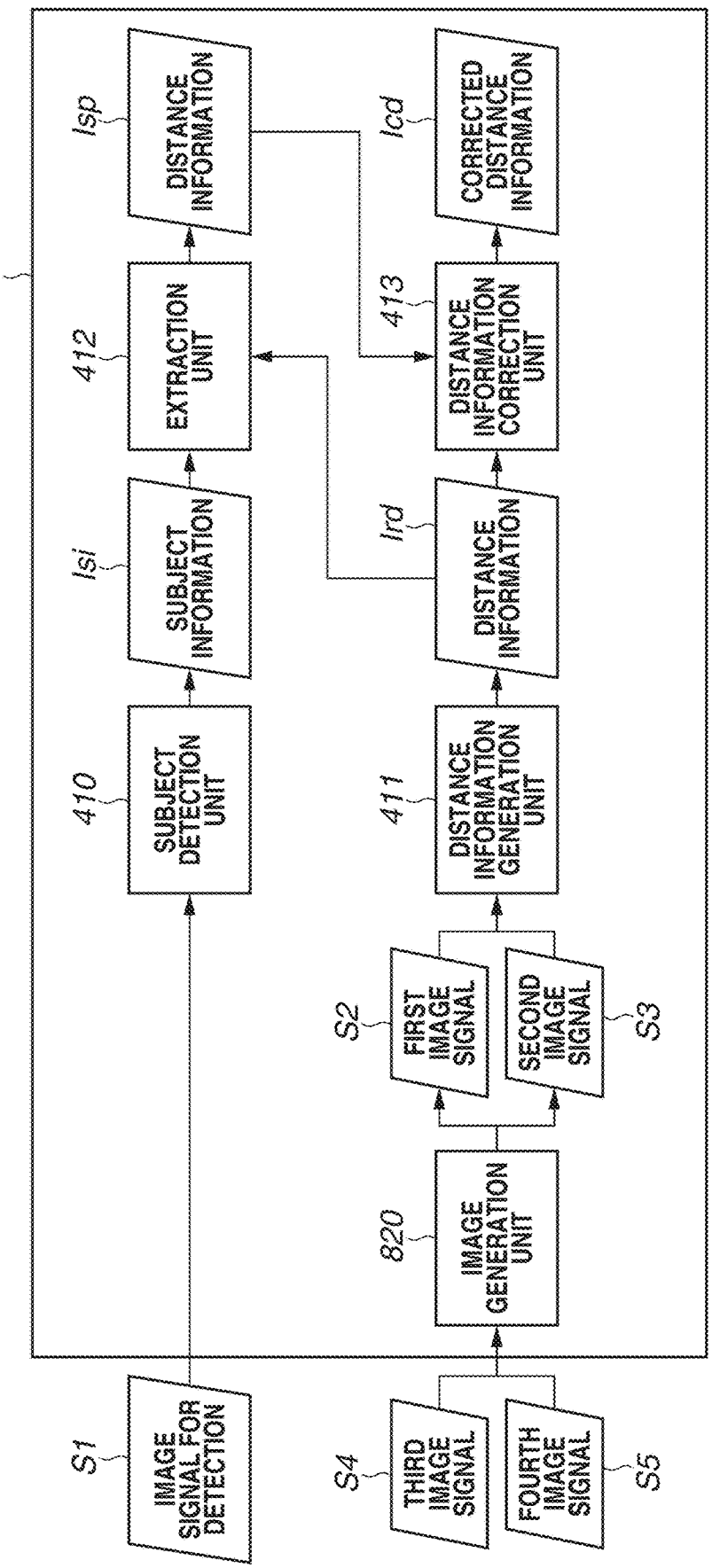

FIG. 8A is a block diagram schematically illustrating the configuration of the distance information generation unit 810 in the present exemplary embodiment, and FIG. 8B is a flowchart illustrating the operations of the distance information generation unit 810.

The distance information generation unit 810 further includes an image generation unit 820 compared with the distance information generation unit 110 in the first exemplary embodiment. The distance information generation unit 810 acquires a third image signal S4 and a fourth image signal S5 from the image sensor 7010, generates the corrected distance information Icd acquired by correcting the distance information Ird, and outputs the corrected distance information Icd.

Details of the processing performed by the subject detection unit 410, the distance information generation unit 411, the extraction unit 412, and the distance information correction unit 413 are similar to those in the first exemplary embodiment, so that description thereof is omitted. The following describes details of the processing performed by the image generation unit 820.

The image generation unit 820 acquires the third and fourth image signals S4 and S5 from the image sensor 7010 and performs image generation processing in step S820 to generate the first and second image signals S2 and S3. The following describes details of the image generation processing in step S820 performed by the image generation unit 820, with reference to FIG. 8C.

In step S821, the image generation unit 820 performs demosaicing on the third and fourth image signals S4 and S5. To generate an image signal by the blue pixel, the pixel values of the image signals are generated by linear interpolation using the luminance value of the nearby blue pixel 750B with respect to the pixel positions of the red pixel 750R and the green pixels 750G1 and 750G2. Similarly, the image signals of the respective wavelength regions with respect to the green and red pixels are generated using interpolation processing (e.g., bilinear interpolation or bicubic interpolation). By demosaicing, the image signal containing the color information about three channels of blue, green, and red is generated at each pixel position.

In luminance signal transformation processing in step S822, the image generation unit 820 generates the first image signal S2 from the third image signal S4 generated in the demosaicing processing in step S821. Similarly, the second image signal S3 is generated from the fourth image signal S5 generated in the demosaicing processing in step S821. To generate the first image signal S2, formula (3) below is applied to each pixel for the first image signal S2 to generate the first image signal S2. In formula (3), Ib is the luminance value of the blue wavelength region contained in the third image signal S4 generated in the demosaicing processing in step S821. Similarly, Ig is the luminance value of the green wavelength region contained in the third image signal S4 generated in the demosaicing, processing in step S821, and Ir is the luminance value of the red wavelength region contained in the third image signal S4 generated in the demosaicing processing in step S821.

The signal value of the first image signal=$Ib/4+Ig/2+Ir/4$ (3).

The second image signal S3 is generated using the fourth image signal S5 generated in the demosaicing processing in step S821, as in the case of the first image signal S2.

The distance information generation unit 411 generates the distance information Ird by the distance information generation processing in step S420 using the first and second image signals S2 and S3 generated by the image generation unit 820.

In the digital camera 100 in the present exemplary embodiment, each pixel group of the image sensor 7010 is configured to be capable of acquiring both the color information and the distance information. Thus, the difference between the pixel position at which the distance information is calculated and the pixel position at which the color information is acquired is small, so that the distance information with respect to a line segment or a detected known-shape region is extracted with great accuracy, and the object distance information is corrected with great accuracy.

The following describes a third exemplary embodiment. As another form of the lens unit 200 of the digital camera 100 and the internal configuration of the digital camera 100 up to the image capturing portion 101, the configuration of an image capturing portion 900 in FIGS. 9A and 9B can be employed.

In FIG. 9A, the image capturing portion 900 includes a first image forming optical system 920a, a second image forming optical system 920b, image sensors 901a and 901b, and a lens driving control unit (not illustrated). The first and second image forming optical systems 920a and 920b are imaging lenses of the image capturing portion 900 and include the function of forming a subject image on the image sensors 901a and 901b, which are image capturing surfaces. The first image forming optical system 920a includes a plurality of lens groups and a diaphragm and includes an exit pupil 930a at a position located at a predetermined distance from the image sensor 901a. The second image forming optical system 920b includes a plurality of lens groups and a diaphragm and includes an exit pupil 930b at a position located at a predetermined distance from the image sensor 901b.

The image sensors 901a and 901b are image sensors including a CMOS sensor or CCD sensor. FIG. 9B is an x-y cross sectional view illustrating the image sensor 901a. In the image sensor 901a in FIG. 9B, a plurality of pixel groups similar to the image capturing pixel group 150 of the image sensor 1010 is arranged. Similarly, in the image sensor 901b, a plurality of pixel groups similar to the image capturing pixel group 150 of the image sensor 1010 is arranged.

The photoelectric conversion portion 153 of the image sensor 901a photoelectrically converts the received light ray to generate an electric signal. The third image signal is generated from the set of electric signals generated by the photoelectric conversion portions 153 of the pixels of the image sensor 901a. Similarly, the photoelectric conversion portion 153 of the image sensor 901b photoelectrically converts the received light ray to generate an electric signal. The fourth image signal is generated from the set of electric signals generated by the photoelectric conversion portions 153 of the pixels of the image sensor 901b.

The group of the first image forming optical system 920a and the image sensor 901a and the group of the second image forming optical system 920b and the image sensor 901b are placed at a predetermined distance from each other. The third and fourth image signals are a set of image signals captured by imaging the subject at substantially the same time from different viewpoints and have an amount of parallax corresponding to the subject distance. Further, the pixels of the image sensors 901a and 901b include a color filter corresponding to the blue, green, and red wavelength regions, so that the third and fourth image signals contain the three types of color information. Specifically, the digital camera 100 includes the function of capturing image signals for detection and the distance measurement function. Further, while the case of the three colors of blue, green, and red is described in the present exemplary embodiment, any other color information or a single color can be employed.

In the digital camera 100 integrated with the image capturing portion 900, the distance information Icd in which the effect of chromatic aberration in the first and second image forming optical systems 920a and 920b is corrected is generated from the third image signal acquired from the image sensor 901a and the fourth image signal acquired from the image sensor 901b, and is output. In addition to the digital camera 100 according to the first and second exemplary embodiments, the digital camera 100 including the image capturing portion 900 according to the present exemplary embodiment calculates the relationship between the first and second image forming optical systems 920a and 920b and the image sensors 901a and 901b, as the image-side change amount, and performs correction. Specifically, the digital camera 100 including the image capturing portion 900 according to the present exemplary embodiment is characterized by having many parameters to be the image-side change amount compared with the digital camera 100 according to the first and second exemplary embodiments. Not all the parameters, however, need to be used. The correction method is similar.

In the digital camera 100 including the image capturing portion 900 according to the present exemplary embodiment, optical axes 940a and 940b are positioned at a great distance from each other to capture images of the same subject from different viewpoints. The optical axes 940a and 940b are positioned at a great distance from each other to increase a change in the amount of parallax per subject distance. Specifically, the distance information with greater accuracy is acquired. In the present exemplary embodiment, the case where the image capturing portion has two optical systems and image sensors has been described. However, the same applies to the case where one optical system and image sensor is moved. In this case, the camera position is changed in the time-axis direction, whereby the optical axis moves and parallax occurs. Although it is necessary to estimate the amount of movement of the camera position, the other processes are the same, and the proposed correction method is similarly applicable, As for the method for estimating the amount of movement of a camera position, the general technique referred to as Simultaneous Localization and Mapping (SLAM) can be used. Although an error occurs when the amount of movement of the camera position is estimated, it is possible to reduce an error including the error.

In a fourth exemplary embodiment, a case will be described where the digital camera described in the first to third exemplary embodiments continuously acquires image signals. In FIG. 4A, the image signal S1 for detection, the first image signal S2, and the second image signal S3 are continuously acquired at a given time interval, whereas in FIG. 8A, the image signal S1 for detection, the third image signal S4, and the fourth image signal S5 are continuously acquired at a given time interval. The time interval does not have to be constant and can be changed according to a change in the external environment, or the like. An example of a constant time interval is 30 fps (one image set is acquired at an interval of 33.3 msec) in a commonly-used moving image acquisition environment. While the following description only corresponds to the first exemplary embodiment, the same is also applicable to the second and third exemplary embodiments. The internal configuration of the distance information generation unit 110 remains the same in the case of the continuous signals.

The relationship between the image forming optical system and the image sensor in which a temporal error occurs, which is discussed as a problem to be solved in the present disclosure, is likely to be changed continuously with respect to the time. This indicates that a change in the relationship between the image forming optical system and the image sensor is small in a case where the continuous signals are used. Thus, the result of the image-side change amount calculated at a time before the current signals are transmitted is used to be able to reduce the repeat processing of steps S441 to S443.

Further, there can be a case where the change is so small that it is not necessary to calculate the image-side change amount with respect to every one of the continuous signals. In this case, the image-side change amount calculation is performed based on predetermined signal intervals or changes in the external environment (the movement amount of a robot or vehicle, or the like in the case where it is mounted on the robot or vehicle). In the case where the calculation is unnecessary, the entire distance information correction processing in step S444 can be performed using the previously-calculated image-side change amount.

Further, in the case of the continuous signals, the matching level judgement in step S442 is performed based on not the threshold value but the number of repeats so that the calculation time of each signal is fixed. In an initial stage, errors remain as entire distance information, but convergence is achieved over time even if the image-side change amount is improved by a smaller number of repeats.

The digital camera in the present exemplary embodiment continuously acquires data to reduce the calculation amount and efficiently perform calibrations corresponding to the temporal change.

In a fifth exemplary embodiment, a method will be described by which the digital camera described in the first to fourth exemplary embodiments provides information indicating that the accuracy of the distance measurement of the digital camera is insufficient, using the image-side change amount. In the present exemplary embodiment, the image processing unit 103 includes an information analysis apparatus 1001 configured to analyze the image-side change amount calculated by the distance information generation unit 110 (810).

An image-side change amount Icc calculated by the distance information generation unit 110 (810) is analyzed using the information analysis apparatus 1001, and if the image-side change amount Icc is not less than a threshold value, a notification (warning) is provided using a unit. The image-side change amount Icc is a change in the relationship between the image forming optical system 201 and the image sensor 1010. In the normal state, a change occurs during the use due to heat and vibrations, but the image-side change amount for the same condition is the same. However, a long-term use can cause the image-side change amount to increase beyond an assumed range. The assumed range is set as the threshold value, and if the image-side change amount is increased beyond the assumed range, a warning is provided to the user to prompt the user to conduct maintenance, etc. When the image-side change amount is large, the image forming position of the image forming optical system 2011 is located so far from the image sensor 1010 that an image is not sufficiently formed in the assumed distance measurement range. In this case, the assumed distance resolution is not obtained, so that if the image-side change amount falls in such a range, an adjustment is needed.

Figure 10:
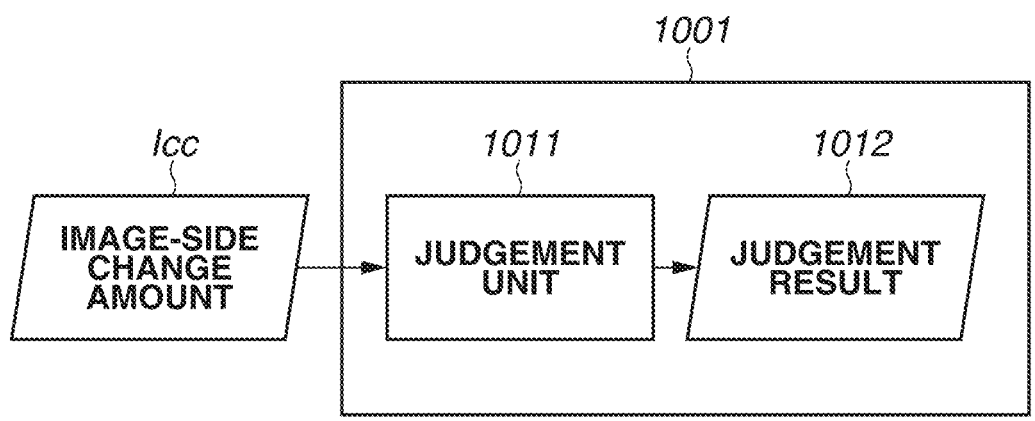
FIG. 10 illustrates the image capturing apparatus and a judgement unit according to a fourth exemplary embodiment.

FIG. 10 is a block diagram illustrating the information analysis apparatus 1001. A judgement unit 1011 judges, using the image-side change amount Icc as an input, whether the image-side change amount is within the normal range, and acquires a judgement result 1012 of the judgement. The judgement result 1012 is displayed on the display 107 by the display control unit 106 as in a commonly-used digital camera. Alternatively, an additional dedicated display device can be included. Further, in the cases where an audio output function is included as in a vehicle, if the state is determined as being an abnormal state, for example a notification by sound can be provided from a speaker of the display 107. Further, a display on a car navigation system is also possible, or nearby repair shops for maintenance, etc. can also be displayed. Any form/method can be used to provide the warning to the user. Further, changes in the correction parameter can be recorded as logs in the memory 104, and the timing of maintenance can be predicted and presented to the user.

Further, the image-side change amount can be transferred via wireless, wired communications, or the like using an information transfer apparatus (not illustrated) instead of the information analysis apparatus 1001 and can be analyzed by another calculation machine (not illustrated) environment, a server, or the like to present a result of the analysis to the user.

As described above, the digital camera in the present exemplary embodiment analyzes the image-side change amount which is a temporal change so that the digital camera can present information such as maintenance information about the digital camera to provide stable performance to the user.

Other Exemplary Embodiment

The target of the present invention is also achievable as follows. Specifically, a storage medium recording the program codes of software describing a process for realizing the functions of the respective exemplary embodiments described above is supplied to a system or apparatus. Then, a computer (or CPU, MPU, or the like) of the system or apparatus reads and executes the program codes stored in the storage medium.

In this case, the program codes read from the storage medium realize the novel functions of the present invention, and the storage medium storing the program codes and the program are also encompassed within the present invention.

Further, examples of the storage medium for supplying the program codes include a flexible disk, hard disk, optical disk, and magneto-optical disk. Further, a compact disk (CD) read-only memory (ROM) (CD-ROM), CD-recordable (CD-R), CD-rewritable (CD-RW), digital versatile disk (DVD) ROM (DVD-ROM), DVD random-access memory (RAM) (DVD-RAM), DVD-RW, DVD-R, magnetic tape, non-volatile memory card, ROM, or the like can also be used.

Further, execution of the program codes read by the computer is enabled to realize the functions of the respective exemplary embodiments described above. Further, the cases are also encompassed where an operating system (OS), etc. running on the computer executes part of or entire processing according to instructions of the program codes to realize the functions of the respective exemplary embodiments.

The following cases are also encompassed. First, the program codes read from the storage medium are written to the memory of a function expansion board inserted in the computer or a function expansion unit connected with the computer. Thereafter, the CPU of the function expansion board or the function expansion unit, or the like executes part of or entire processing according to instructions of the program codes.

Further, the present invention is applicable not only to apparatuses that mainly aim to capture images, such as digital cameras, but also to any apparatus that includes an image capturing apparatus therein or to which an external image capturing apparatus is to be connected, such as a mobile phone, personal computer (PC) (laptop PC, desktop PC, tablet PC, or the like), or game machine. Accordingly, the term "image capturing apparatus" as used herein is intended to encompass any electronic devices including an image capturing function.

The present invention enables reduction of the effect of temporal errors in the image capturing apparatus including the function of measuring distance information indicating the position of a subject in a depth direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-208366, filed Oct. 27, 2017, which is hereby incorporated by reference herein in its entirety.

What is claimed is:

1. A distance information generation apparatus comprising:
    one or more processors; and
    a memory storing instructions which, when the instructions are executed by the one or more processors, cause the distance information generation apparatus to function as:
    a generation unit configured to generate distance information using a plurality of image signals;
    a detection unit configured to detect a line segment using the plurality of image signals;
    an extraction unit configured to extract, from the distance information generated by the generation unit, distance information corresponding to the line segment detected by the detection unit;
    a calculation unit configured to calculate a correction parameter by comparing a shape formed by the distance information extracted by the extraction unit and a shape corresponding to the line segment at a plurality of points, and evaluating linearity of the distance information extracted by the extraction unit in a three dimensional space, and, in a case where the linearity does not satisfy a predetermined condition, reducing a difference from the distance information extracted by the extraction unit based on the comparison and calculating the correction parameter using the reduced distance information;
    a correction unit configured to correct the distance information generated by the generation unit using the correction parameter calculated by the calculation unit for reducing an effect of temporal errors.

2. The distance information generation apparatus according to claim 1, further comprising a memory configured to store the correction parameter calculated by the calculation unit,
    wherein the correction unit corrects, using the correction parameter stored in the memory, the distance information generated by the generation unit.

3. The distance information generation apparatus according to claim 1, wherein the calculation unit calculates the correction parameter with which a shape formed at an object distance by the distance information extracted by the extraction unit is corrected to become closer to a shape formed by the distance information corresponding to the line segment detected by the detection unit.

4. The distance information generation apparatus according to claim 1, wherein the calculation unit calculates the correction parameter to be applied to the distance information generated by the generation unit by comparing a shape formed at an object distance by the distance information extracted by the extraction unit with a shape formed by the distance information corresponding to the line segment detected by the detection unit.

5. The distance information generation apparatus according to claim 1,
    wherein the distance information generated by the generation unit is a defocus map, and
    wherein the calculation unit estimates an image-side change amount indicating an amount of change in the distance information generated by the generation unit on an image side due to a positional relationship between an image forming optical system and an image sensor by which first and second image signals are captured, and calculates the correction parameter.

6. The distance information generation apparatus according to claim 5, wherein the image-side change amount is a shift component of the image forming optical system and the image sensor from one of or a plurality of an x-direction default position, a y-direction default position, and a z-direction default position.

7. The distance information generation apparatus according to claim 6, wherein the image-side change amount is a rotation component of the image forming optical system and the image sensor from one of or a plurality of an x-axial direction default position, a y-axial direction default position, and a z-axial direction default position.

8. The distance information generation apparatus according to claim 7, wherein the image-side change amount is a change in a focal length of the image forming optical system.

9. The distance information generation apparatus according to claim 1,
wherein the generation unit generates a plurality of pieces of corresponding distance information using a plurality of sets of first and second image signals captured in time-series, and
wherein the correction unit uses a shared correction parameter stored in a memory with respect to the plurality of pieces of corresponding distance information.

10. The distance information generation apparatus according to claim 9,
wherein the generation unit sequentially generates the plurality of pieces of corresponding distance information using the first and second image signals sequentially acquired, and
wherein each time a predetermined number of pieces of the distance information extracted by the extraction unit are generated, the calculation unit calculates the correction parameter and stores the calculated correction parameter in the memory.

11. The distance information generation apparatus according to claim 10,
wherein the generation unit sequentially generates the plurality of pieces of corresponding distance information using the first and second image signals sequentially acquired, and
wherein in a case where there is a change in the distance information extracted by the extraction unit and the change is not less than a reference level, the calculation unit newly calculates the correction parameter and stores the newly-calculated correction parameter in the memory.

12. The distance information generation apparatus according to claim 1, wherein in a case where a plurality of subjects are detected by the detection unit, the calculation unit calculates the correction parameter based on distance information corresponding to each of the plurality of subjects and extracted by the extraction unit and reliability.

13. The distance information generation apparatus according to claim 1, wherein the one or more processors further cause the distance information generation apparatus to function as an information transfer unit configured to transfer the correction parameter stored in a memory to an external apparatus.

14. The distance information generation apparatus according to claim 1, further comprising a camera configured to capture first and second image signals.

15. The distance information generation apparatus according to claim 14, wherein the camera receives light rays transmitted through respective different pupil regions of an image forming optical system and generates the first and second image signals.

16. The distance information generation apparatus according to claim 15, wherein the camera captures an image using first and second image sensors each corresponding to a different one of image forming optical systems to generate the first and second image signals respectively.

17. The distance information generation apparatus according to claim 1, wherein a focus position is automatically adjusted by operating one or both of an image forming optical system and a sensor of an image capturing apparatus, using the distance information generated by the generation unit.

18. A method of controlling a distance information generation apparatus, the method comprising:
generating distance information using a plurality of image signals;
detecting a line segment using the plurality of image signals;
extracting, from the generated distance information, distance information corresponding to the detected line segment;
calculating a correction parameter by comparing a shape formed by the extracted distance information and a shape corresponding to the line segment at a plurality of points, and evaluating linearity of the extracted distance information in a three dimensional space, and, in a case where the linearity does not satisfy a predetermined condition, reducing a difference from the extracted distance information based on the comparison and calculating the correction parameter using the reduced distance information;
correcting the generated distance information using the calculated correction parameter for reducing an effect of temporal errors.

* * * * *